US012227054B2

(12) United States Patent
Sardes et al.

(10) Patent No.: US 12,227,054 B2
(45) Date of Patent: Feb. 18, 2025

(54) WHEEL SUSPENSION SYSTEM WITH MOBILE STEERING AXIS

(71) Applicant: REE AUTOMOTIVE LTD, Glil-Yam (IL)

(72) Inventors: Ahishay Sardes, Tel-Aviv (IL); Ran Dekel, Nofit (IL); Eylon Avigur, Ramat-Gan (IL); Tomer Segev, Tel-Aviv (IL); Amit Aknin, Karkom (IL); Eran Starik, Tel Aviv-Jaffa (IL); Shmuel Chioclea, Tel Aviv (IL)

(73) Assignee: REE AUTOMOTIVE LTD, Glil-Yam (IL)

( * ) Notice: Subject to any disclaimer, the term of this patent is extended or adjusted under 35 U.S.C. 154(b) by 320 days.

(21) Appl. No.: 17/612,365

(22) PCT Filed: May 21, 2020

(86) PCT No.: PCT/IL2020/050558
§ 371 (c)(1),
(2) Date: Nov. 18, 2021

(87) PCT Pub. No.: WO2020/234882
PCT Pub. Date: Nov. 26, 2020

(65) Prior Publication Data
US 2022/0297487 A1    Sep. 22, 2022

Related U.S. Application Data

(60) Provisional application No. 62/850,849, filed on May 21, 2019.

(51) Int. Cl.
*B60G 3/20* (2006.01)
*B60K 7/00* (2006.01)
(Continued)

(52) U.S. Cl.
CPC .............. *B60G 3/20* (2013.01); *B60K 7/0007* (2013.01); *B62D 7/08* (2013.01); *B62D 7/16* (2013.01);
(Continued)

(58) Field of Classification Search
CPC ........ B60G 3300/346; B60G 2200/347; B60G 3/20; B60G 2200/143; B60G 2200/18;
(Continued)

(56) References Cited

U.S. PATENT DOCUMENTS 3,229,783 A * 1/1966 Muller ................... B60G 3/285
180/359
4,930,804 A * 6/1990 Tattermusch ............ B60G 3/20
280/124.138
(Continued)

FOREIGN PATENT DOCUMENTS

CN    104487268 A    4/2015
DE    29519108 U1    4/1997
(Continued)

OTHER PUBLICATIONS

European Search Report for EP Patent Appl. No. 20809511.7 dated May 30, 2023.
(Continued)

*Primary Examiner* — Timothy Wilhelm
(74) *Attorney, Agent, or Firm* — PEARL COHEN ZEDEK LATZER BARATZ LLP

(57) ABSTRACT

Generally, a suspension system for a wheel of a vehicle is disclosed. The system may include at least one pair of arms each including a first arm and a second arm. Each of the first arm and the second arm of the at least one pair of arms may have a first end adapted to be rotatably connected to a wheel interface and a second end adapted to be rotatably connected to a reference frame of the vehicle, while the first arm and (Continued)

the second arm may be set across each other and define a mobile steering axis at a virtual intersection therebetween such that the mobile steering axis moves with respect to the reference frame when the wheel interface changes its steering angle relative to the reference frame.

20 Claims, 15 Drawing Sheets

(51) Int. Cl.
  *B60K 17/04*    (2006.01)
  *B62D 7/08*    (2006.01)
  *B62D 7/16*    (2006.01)
  *B62D 7/18*    (2006.01)

(52) U.S. Cl.
  CPC .......... *B62D 7/18* (2013.01); *B60G 2200/143* (2013.01); *B60G 2200/18* (2013.01); *B60G 2200/44* (2013.01); *B60G 2204/143* (2013.01); *B60G 2204/148* (2013.01); *B60G 2204/182* (2013.01); *B60G 2204/30* (2013.01); *B60G 2204/419* (2013.01); *B60G 2206/11* (2013.01); *B60K 2007/0061* (2013.01); *B60K 17/043* (2013.01)

(58) Field of Classification Search
  CPC .......... B60G 2200/44; B60G 2204/148; B60G 2204/143; B60G 2204/182; B60G 2204/30; B60G 2204/419; B60G 2206/11; B60G 2300/50; B60K 7/0007; B60K 17/043; B60K 2007/0046; B60K 2007/0061; B62D 7/08; B62D 7/18; B62D 7/16; B62D 5/0418
  See application file for complete search history.

(56) References Cited

U.S. PATENT DOCUMENTS

| | | | | |
|---|---|---|---|---|
| 5,346,241 | A * | 9/1994 | Lee ................. | B60G 3/265 |
| | | | | 280/124.135 |
| 5,421,606 | A * | 6/1995 | Chun ................. | B60G 3/20 |
| | | | | 280/124.141 |
| 5,451,073 | A * | 9/1995 | Inoue ................. | B60G 3/26 |
| | | | | 280/124.145 |
| 5,507,510 | A * | 4/1996 | Kami ................. | B60G 3/26 |
| | | | | 280/124.136 |
| 6,173,978 | B1 * | 1/2001 | Wagner ................. | B60G 7/00 |
| | | | | 280/124.135 |
| 6,293,561 | B1 * | 9/2001 | Goetzen ................. | B62D 17/00 |
| | | | | 280/86.757 |
| 6,550,797 | B2 * | 4/2003 | Wagner ................. | B60G 3/18 |
| | | | | 280/124.135 |
| 6,675,925 | B2 * | 1/2004 | Takahashi ............ | B60K 17/303 |
| | | | | 180/343 |
| 7,234,708 | B2 * | 6/2007 | Blondelet ............ | B62D 17/00 |
| | | | | 280/5.521 |
| 7,255,357 | B2 * | 8/2007 | Wagner ................. | B60G 3/18 |
| | | | | 280/124.135 |
| 7,377,017 | B1 | 5/2008 | Manak | |
| 7,389,998 | B2 * | 6/2008 | Kondo ................. | B62D 7/20 |
| | | | | 280/5.52 |
| 7,823,673 | B2 | 11/2010 | Asogawa | |
| 7,963,538 | B2 * | 6/2011 | Roland ................. | B60G 3/26 |
| | | | | 280/124.138 |
| 8,851,489 | B2 * | 10/2014 | Balboni ................. | B62D 9/02 |
| | | | | 280/93.504 |
| 8,950,521 | B2 * | 2/2015 | Piontek ................. | B62D 7/08 |
| | | | | 180/6.34 |
| 9,545,827 | B2 * | 1/2017 | Goldberg ................. | B60G 7/02 |
| 11,230,150 | B2 * | 1/2022 | Aknin ................. | B60K 7/0007 |
| 11,479,311 | B2 * | 10/2022 | Doerksen ............ | A63C 17/08 |
| 11,524,735 | B2 * | 12/2022 | Ishikawa ................. | B62D 61/10 |
| 11,571,939 | B2 * | 2/2023 | Berardi ................. | B60G 3/18 |
| 11,685,208 | B2 * | 6/2023 | Sardes ............... | B60G 17/0523 |
| | | | | 280/124.109 |
| 11,691,471 | B2 * | 7/2023 | Okuyama ................. | B60G 3/20 |
| | | | | 280/124.156 |
| 11,713,076 | B2 * | 8/2023 | Avigur ................. | B62D 15/023 |
| | | | | 280/93.502 |
| 2003/0155735 | A1 | 8/2003 | Takahashi et al. | |
| 2004/0046350 | A1 * | 3/2004 | Wagner ................. | B60G 7/00 |
| | | | | 280/124.135 |
| 2011/0095502 | A1 | 4/2011 | Dada | |
| 2011/0101637 | A1 | 5/2011 | Shibuya | |
| 2014/0008141 | A1 * | 1/2014 | Kageyama ............ | B60G 3/20 |
| | | | | 180/400 |
| 2023/0051754 | A1 * | 2/2023 | Chang ................. | B62D 5/001 |
| 2023/0115506 | A1 * | 4/2023 | Chang ................. | B62D 7/18 |
| | | | | 180/408 |
| 2023/0129358 | A1 * | 4/2023 | Chang ................. | B62D 7/1545 |
| | | | | 74/422 |
| 2023/0135265 | A1 * | 5/2023 | Cimatti ................. | B60G 3/26 |
| | | | | 280/124.135 |

FOREIGN PATENT DOCUMENTS

| | | |
|---|---|---|
| DE | 10 2007 047786 | 5/2009 |
| DE | 10 2012 015333 | 2/2014 |
| DE | 10 2016 124870 | 6/2018 |
| EP | 2875974 A1 | 5/2015 |
| EP | 3 956 158 | 2/2022 |
| JP | 2008 018924 | 1/2008 |
| WO | WO2005092644 A1 | 10/2005 |
| WO | WO 2008/053034 | 5/2008 |
| WO | WO2020212987 A1 | 10/2020 |

OTHER PUBLICATIONS

International Search Report and Written Opinion for PCT Appl. No. PCT/IL2020/050558 dated Aug. 23, 2020.

* cited by examiner

Top View:

Top View:

Top View:

Front View:

WHEEL SUSPENSION SYSTEM WITH MOBILE STEERING AXIS

CROSS-REFERENCE TO RELATED APPLICATIONS

This application is a National Phase Application of PCT International Application No. PCT/IL2020/050558, International Filing Date May 21, 2020, claiming the benefit of U.S. Provisional Patent Application No. 62/850,849, filed May 21, 2019, which are hereby incorporated by reference.

FIELD OF THE INVENTION

The present invention relates to the field of suspension systems, and more particularly, to suspension systems with mobile steering axis.

BACKGROUND OF THE INVENTION

When designing a front wheel suspension while trying to minimize the wheel incursion into the cabin space, one of the factors for the lateral distance of the wheel from the chassis is a steering angle and the location of the steering axis (often refer to as a king-pin axis).

A conventional steering axis often passes close to a center or the spinning axis of the wheel (in top view) as illustrated in FIGS. 1A and 1B. This means that at a steering angle of 45 degrees, the wheel protrudes into the chassis is approximately a third of the wheel's diameter in length.

SUMMARY OF THE INVENTION

Some aspects of the present invention may provide a suspension system for a wheel of a vehicle, the system may include: at least one pair of arms each including a first arm and a second arm, wherein each of the first arm and the second arm has a first end adapted to be rotatably connected to a wheel interface and a second end adapted to be rotatably connected to a reference frame of the vehicle; wherein the first arm and the second arm of the at least one pair of arms are set across each other and define a mobile steering axis extending through a virtual intersection therebetween such that the mobile steering axis moves with respect to the reference frame when the wheel interface changes its steering angle relative to the reference frame.

In some embodiments, the steering axis may move at least partially in a direction which is substantially parallel to the longitudinal axis of the vehicle. In some embodiments, a movement ratio defined between a transformation of the steering axis in parallel to the longitudinal axis of the vehicle and a transformation of the steering axis in a lateral direction is higher than 10. In some embodiments, the maximal steering angle in at least one steering direction is between 45 and 90 degrees. In some embodiments, the wheel interface may allow spinning the wheel about a spinning axis, such that the second end of the at least one pair of arms is positioned between the spinning axis and the rim of the wheel.

In some embodiments, the wheel interface allows spinning the wheel about a spinning axis, such that a virtual intersection of the at least one pair of arms is positioned between the spinning axis and the rim of the wheel. In some embodiments, the wheel interface allows spinning the wheel about the spinning axis, such that the distance between the steering axis and the spinning axis increases when increasing the steering angle in at least one direction. In some embodiments, the movement of the steering axis is non-continuous, when changing the steering angle.

In some embodiments, the suspension system may further include: a steering actuator; and a steering controller and wherein the steering controller is adapted to control the steering actuator to terminate steering when the steering angle is in the range of between 45 and 90 degrees.

Some additional aspects of the invention may be directed to a suspension system for a steerable wheel of a vehicle. In some embodiments, the suspension system may include: a wheel interface, adapted to support a wheel having a spinning axis; and one or more suspension arms connected to the wheel interface; wherein, the wheel interface is steerable with respect to the one or more suspension arms about a steering axis; and the position of the steering axis is adaptable in a longitudinal direction with respect to the vehicle.

In some embodiments, steering the wheel interface changes the position of the steering axis in a longitudinal direction with respect to the wheel interface. In some embodiments, steering the wheel interface may change the distance between the steering axis and the spinning axis. In some embodiments, rotating of the one or more suspension arms with respect to the wheel interface changes the distance between the steering axis position with respect to the spinning axis. In some embodiments, the steering axis is defined by the one or more suspension arms, and the wheel interface.

In some embodiments, the suspension system may further include a reference frame, adapted to couple the suspension system to the vehicle; and the one or more suspension arms are coupled to the reference frame. In some embodiments, the maximal steering angle towards at least one steering direction is between 45 and 90 degrees.

Some aspects of the invention may be directed to a vehicle, having one or more steerable wheels. The vehicle may include: a vehicle platform, one or more suspension systems connected to the vehicle platform, including: a wheel interface, adapted to mount a steerable wheel to the suspension system; one or more suspension arms supporting the wheel interface; and a steering axis, movable in a longitudinal direction with respect to the vehicle without having an interference between the wheel and the vehicle platform.

In some embodiments, the vehicle platform comprises a wheel well to accommodate the steerable wheel; and a distance between the most proximate edge of the steerable wheel and the wheel well is between 0 and 10 cm, in a steering position having a steering angle in at least one steering direction is between 60 and 90 degrees. In some embodiments, the vertical size of the suspension system is smaller than the diameter dimension of the wheel.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1A:
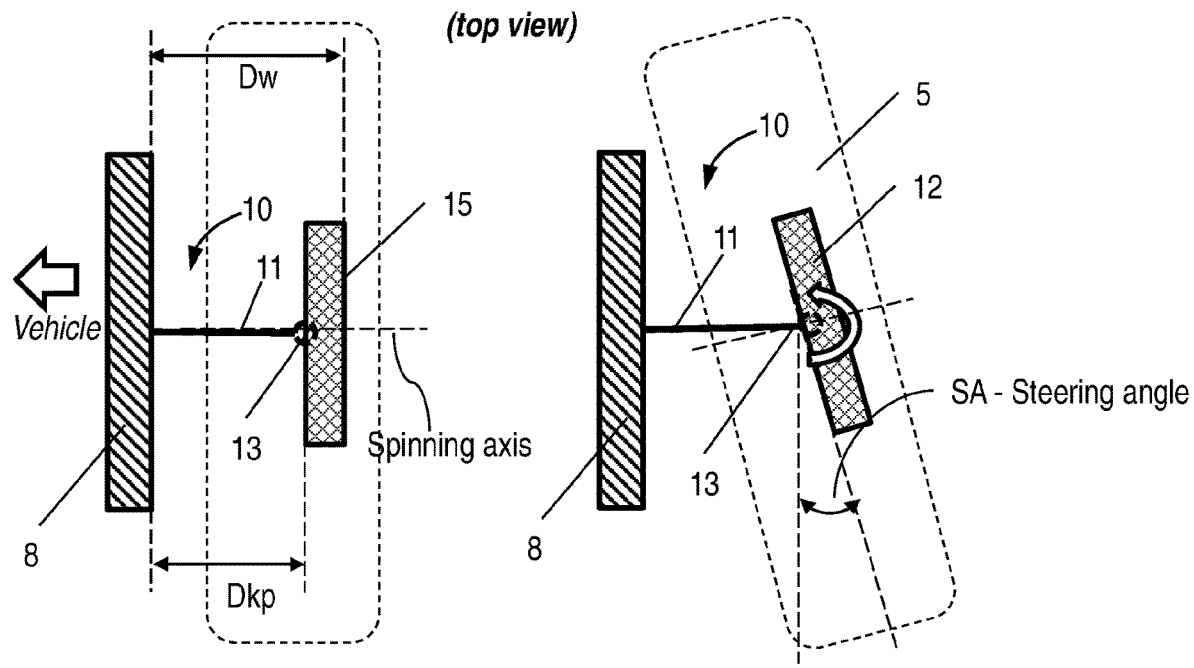
FIGS. 1A and 1B are schematic illustrations of a prior art suspension system and a wheel of a vehicle.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Some aspects of the present invention may provide a suspension system for a wheel of a vehicle having a mobile steering axis. Such a suspension system may include one or more arms for connecting the wheel to a reference frame (e.g., vehicle platform) while enabling the wheel to be steered about a steering axis, which is mobile with respect to the vehicle. The movement of the steering axis may be substantially along a longitudinal axis of the suspension system/vehicle. The movement of the steering axis may be initiated by the changing the steering angle of the wheel interface/wheel, e.g. when steering the wheel.

In this manner, the incursion of the wheel the frame of the vehicle (upon steering of the wheel interface/wheel) may be significantly reduced as compared to prior art suspension systems having a stationary steering axis. In some embodiments, the suspension system may allow to increase the steering angle of the wheel without the need to increase the lateral distances between the wheel's hub and the reference frame. In some embodiments, the suspension system may allow reducing the lateral distance between the wheel's hub and the vehicle's reference frame, while allowing a sufficient (e.g. per standard) steering of the wheel (e.g. at least as of the steering in prior art having longer lateral distance between the wheel's hub and the reference frame).

The suspension system may include at least one pair of arms each including a first arm and a second arm. The first arm and the second arm of the at least one pair of arms may be set across each other to define a mobile steering axis extending through a virtual intersection therebetween, while each of the first arm and the second arm may be rotatably connected at its first end to a wheel interface and at its second end to a reference frame of the vehicle/suspension system.

In some aspects of the invention, the 'mobile steering axis' practically acts as a virtual kingpin in a steering and suspension assembly, e.g. serving as a steering axis about which the respective wheel is steered (changing its relative angle to the chassis) and optionally serving as camber axis.

In some embodiments, the suspension system may allow a vertical movement of the wheel interface with respect to a vertical axis of the vehicle. In some embodiments, the suspension system may include a shock absorption and springing means adapted for damping motions and supporting a weight of the vehicle, e.g. substantially along the vertical axis of the suspension system/vehicle while enabling steering of the wheel interface.

In some embodiments, the suspension system may include a motor coupled to the wheel of the vehicle via a transmission assembly such that rotations generated by the motor may be transmitted to the wheel while enabling steering of the wheel interface.

Figure 1B:
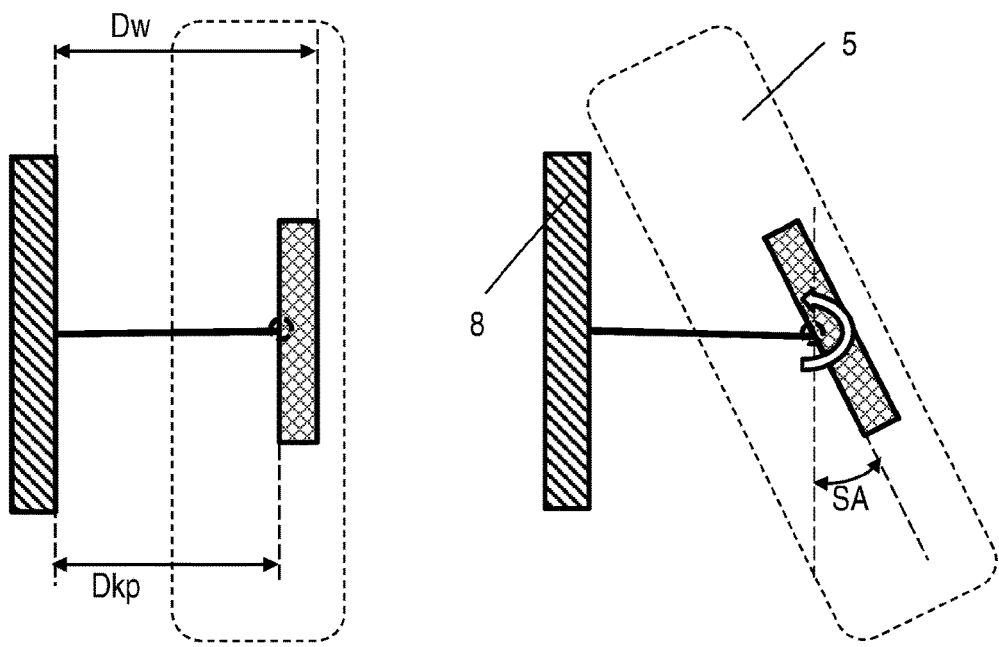

For comparison, prior art suspension system is disclosed. Referring now to FIGS. 1A and 1B which are schematic top view illustrations of an example of a prior art suspension system for a wheel of a vehicle. A prior art steering system 10, illustrated in FIG. 1A, may include a suspension arm 11 connected via steering/pivoting connection axis 13 to a wheel interface 12 at one end and defines a steering axis 13 (e.g., a kingpin axis) and to a reference frame 8 of the vehicle at the other end. In such an arrangement a lateral distance Dkp between reference frame 8 and steering axis 13 defines the maximum steering angle SA at which wheel 5 will not protrudes into reference frame 8. In order to increase the maximum steering angle SA without increasing the protrudes into reference frame 8, lateral distances Dw (the lateral distance between reference frame 8 and wheel 5 hub) and Dkp must be increased, as illustrated in FIG. 1B in comparison to steering angle SA of FIG. 1A. Increasing lateral distances Dw and Dkp will come on the expanse of the vehicle's inner space, for example, the cabin space, or the outer lateral size (width) of the vehicle between wheels.

Figure 2A:
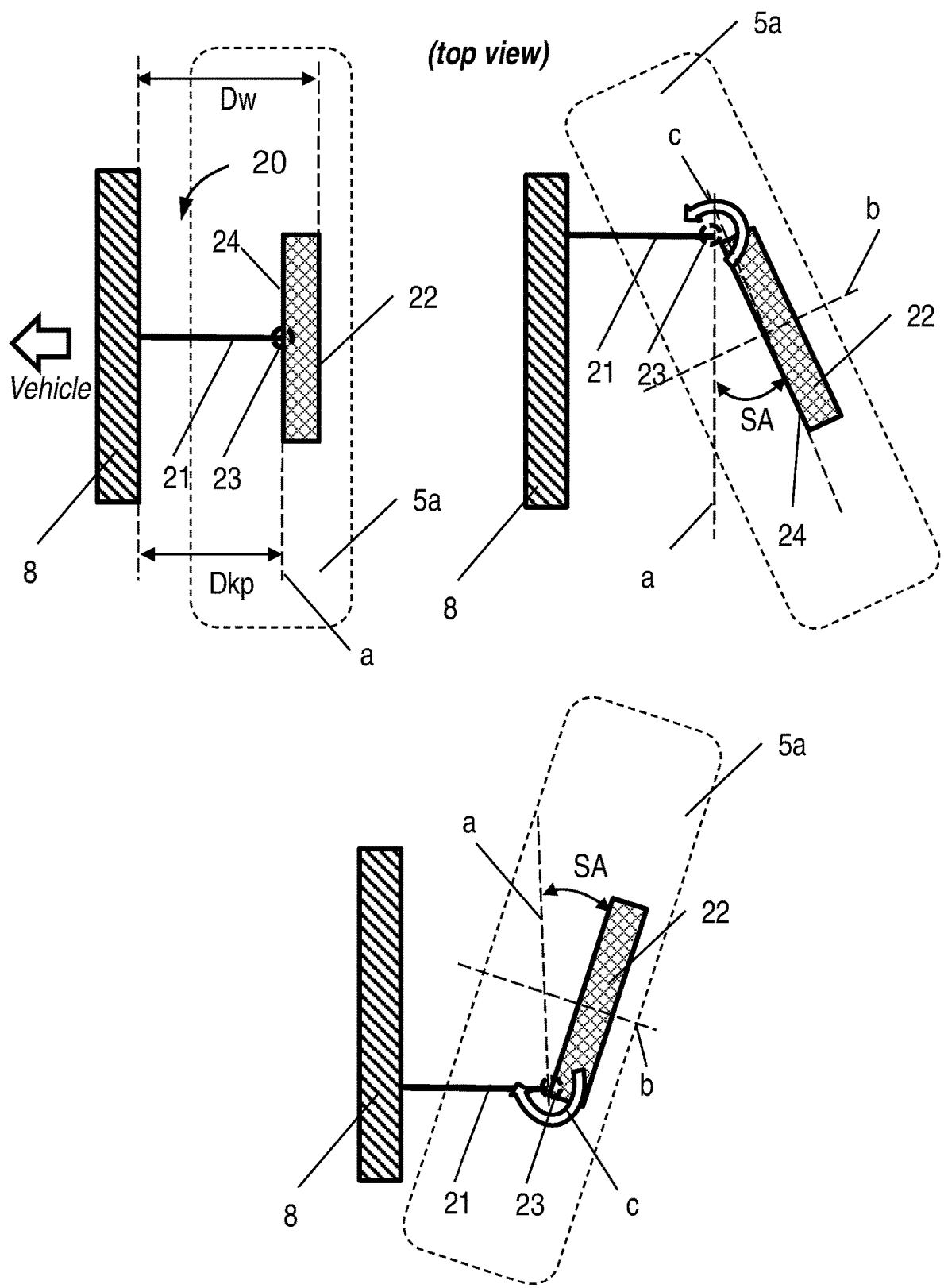
FIG. 2A shows schematic illustrations of a suspension system and a wheel of a vehicle, according to some embodiments of the invention.

Reference is now made to FIG. 2A which shows schematic illustrations of a suspension system for a steerable wheel of a vehicle, according to some embodiments of the invention. FIG. 2A shows top view illustrations of a suspension system 20 assembled to vehicle 8 and supporting wheel 5a. System 20 may include a wheel interface 22 adapted to support wheel 5a having a spinning axis 'b' (e.g., via wheel hub, which may be assembled and/or integrated within the wheel interface). System 20 may further include one or more suspension arms 21 connected to wheel interface 22. In some embodiments, wheel interface 22 may be rotatable with respect to one or more suspension arms 21 about a steering axis 23, (which defines the kingpin axis). In some embodiments, steering axis 23 may be a mobile steering axis configured to move along a longitudinal axis 'a' of suspension system 20. In some embodiments, the movement of steering axis 23 is derived from steering wheel 5a in a continuous (dynamic) way, when steering angle (SA) of wheel 5a changes.

According to some embodiments, the movement of the steering axis is intermitted, prior or during the steering of wheel 5a.

In some embodiments, the maximal steering angle towards at least one steering direction may be between 45 and 90 degrees. In some embodiments, the maximal steering angle towards at least one steering direction may be between 45 and 60 degrees. In some embodiments, the maximal steering angle towards at least one steering direction may be between 60 and 90 degrees. As used herein, the steering direction is the direction to which wheel 5a is turning about steering axis 23 and is illustrated in FIG. 2A by curved arrow 'c'.

In some embodiments, the position of steering axis 23 may be adaptable in longitudinal direction 'a' with respect to vehicle frame 8. In some embodiments, steering of wheel interface 22 may change the position of steering axis 23 in the longitudinal direction of longitudinal axis 'a' with respect to wheel interface 22. The term "vehicle frame" may refer to one or more of: a floorpan of the vehicle, vehicle chassis, vehicle frame or sub-frame, a platform adapted to hold a body of the vehicle, wheel well accommodating the wheel, and the like.

In some embodiments, the steering of wheel interface 22 may change the distance between steering axis 23 and a spinning axis 'b', as illustrated. In some embodiments, rotating one or more suspension arms 21 with respect to wheel interface 23 may change the distance between the position of steering axis 23 with respect to spinning axis 'b'.

In some embodiments, steering axis 23 may be located at an interface between arm 21 and wheel interface 22 as illustrated. In some embodiments, arm 21 is connected to wheel interface 22 by an adapter which allows movement of arm 21 with respect to wheel interface 22.

Figure 2B:
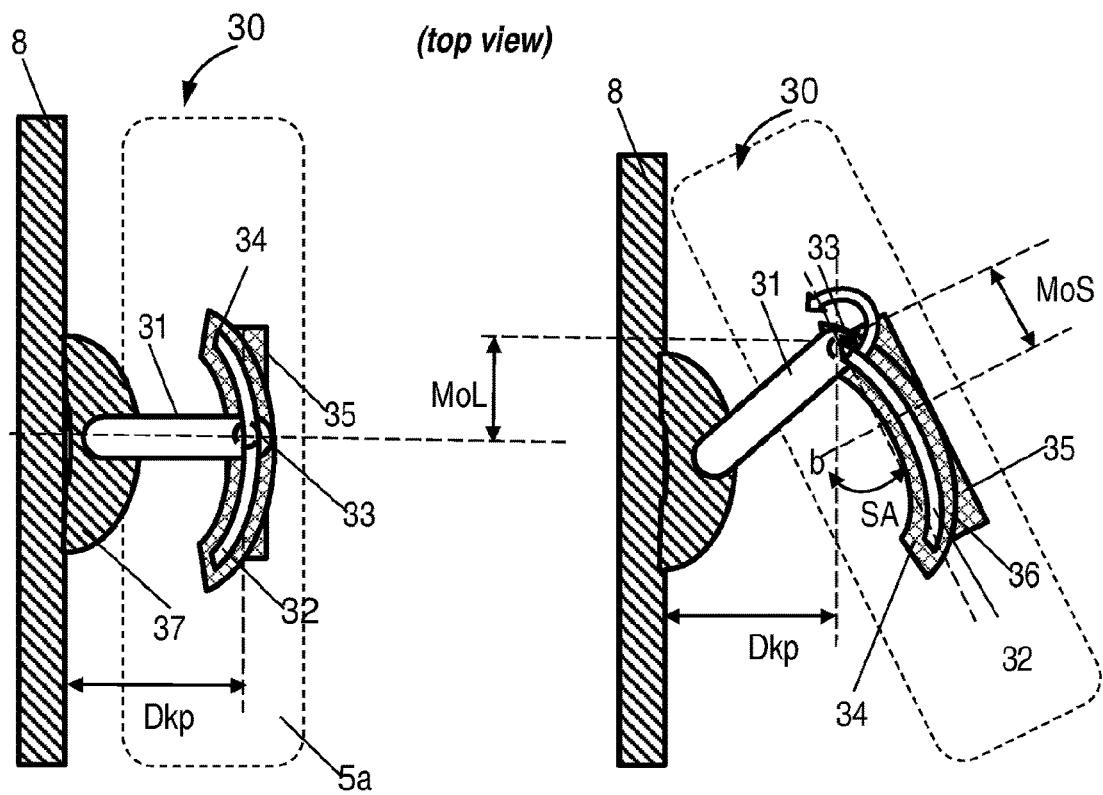
FIG. 2B shows schematic illustrations of a suspension system and a wheel of a vehicle, according to some embodiments of the invention.

Reference is now made to FIG. 2B which is a top view illustration of a suspension system according to some embodiments of the invention. A system 30 according to some embodiments of the invention may be configured to restrain one or more arms 31 to move in a predefine path 32 which ensure a longitudinal movement MoL of steering axis 33 with respect to reference frame 8, as illustrated. In some embodiments, predefine path 32 may be included in a guide 34 (e.g., a bracket, an extension, etc.) and may define the movement MoS of steering axis 33 with respect to spinning axis 'b'. In some embodiments, one or more arms 31 may be restrained to move in a predetermined path 32 on a surface 36 of wheel interface 35. In some embodiments, one or more arms 31 may be movably connected to guide 34 such that the one or more arms have an adjustable (intermittent or continuous) position within movement path 32. In a non-limiting example, one or more arms 31 may be coupled to one or more slots included in guide 34 (as illustrated) that defines path 32. The one or more slots may allow a movement of one or more arms 31 along path 32 for steering wheel interface 35. In some embodiments, the slot is curved (as illustrated).

Suspension system 30 may further include an arm support 37 connected (or integrated) to reference frame 8. Arm support 37 may be pivotally connected to one or more arms 31, thus allowing one or more arms 31 to rotate with respect to frame 8. In some embodiments, arm support 37 is moveable with respect to frame 8. In some embodiments, arm support 37 is rotatable with respect to frame 8, to allow a vertical motion of one or more arms 31, e.g. to allow a suspension motion of the wheel interface 35.

Figure 2C:
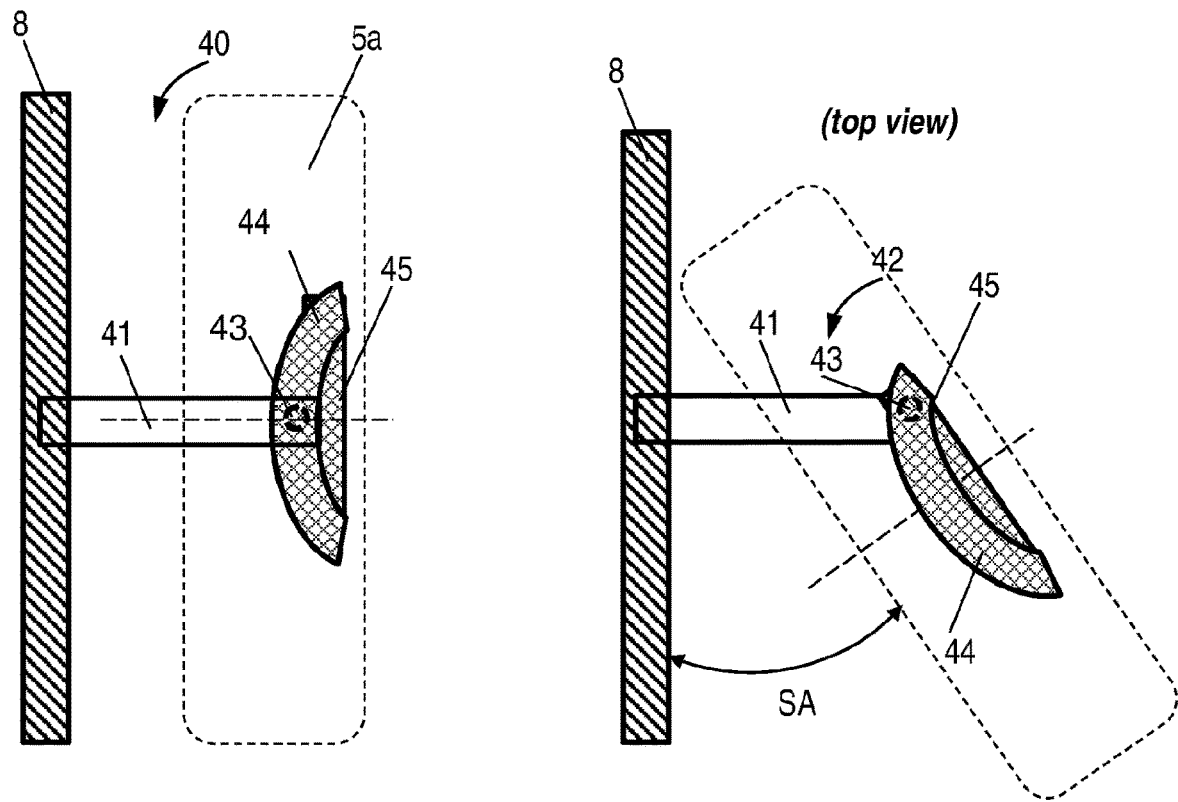
FIG. 2C shows schematic illustrations of a suspension system and a wheel of a vehicle, according to some embodiments of the invention.

Reference is now made to FIG. 2C which are top view illustrations of a suspension system according to some embodiments of the invention. In another nonlimiting example, a suspension system 40 may include one or more guides 44 may be assembled to a sub-frame. One or more arms 41 may be movably connected to one or more guides 44, such that arm 41 rotate with respect to wheel interface 45 and steering axis 43 is defined to guide the connection point of guide 44 with arm 41. In some embodiments, each guide 44 may have a slot (not illustrated), as illustrated and discussed above with respect to guide 34 of FIG. 2B, which defines a movement path in which arm 41 slides when steering wheel interface 45. In some embodiments, bracket/slot is curved.

In another nonlimiting example, one or more guides 34 and/or 44 may be coupled to wheel interface 35 and/or 45 and arm 31 and/or 41 may be movably connected to the guide, such that arm 31 and/or 41 rotates with respect to wheel interface 35 and/or 45. In some embodiments, the guide is shaped to define a movement path for arm 31 and/or 41 when assembled to the guide. In some embodiments, the movement path (e.g., path 32) is shaped by a slot (illustrated in FIG. 2B) in which the arm can slide when steering the wheel interface. In some embodiments, the movement path is curved (as illustrated in FIG. 2B). Having a convex movement path (as in suspension system 40) may allow having arm 41 stationary, without requiring a movement with respect to frame 8. Having a concave, movement path (as in suspension system 30) may allow a shorter arm 31 (shorter Dkp) to achieve a required steering angle.

In another alternative embodiment, the system includes a sub-frame, adapted to connect to the vehicle frame. In some embodiments, the one or more arms (e.g., arms 31 of system 30) may be assembled in one or more guiding slots defined in the sub-frame (not illustrated) and the one or more slots may allow a movement path of one or more arms 31 (e.g. when steering wheel interface 35). In some embodiments, one or more guiding elements (e.g., brackets 34 of system 30) may be assembled to a sub-frame and arms 31 may be movably connected to the guiding element, such that the arm rotates with respect to wheel interface 35. In some embodiments, guide has a slot which defines a movement path in which the arm slides when steering the wheel interface. In some embodiments, guiding element/guiding slot, is adapted to enable movement of arm 31 in a longitudinal direction, thus allowing the movement of steering axis in a longitudinal direction.

In some embodiments, suspension systems 20, 30 or 40 may include a pair of one or more arms 21, 31 and 41 respectively, each of the pair of the one or more arms 21, 31 and 41 respectively are coupled to wheel interface 22/35/45, such that one or more arms 21, 31 and 41 is coupled to an upper portion of wheel interface 31 and one or more arms 21, 31 and 41 is coupled to a bottom portion of wheel interface 31. Such pair of arms, may increase the rigidity of the suspension system, and may reduce the degrees of freedom of the wheel in an axis perpendicular to the spinning axis of the wheel. In some embodiments, upper portion of wheel interface 31 and bottom portion of wheel interface 31 are located at opposite directions of spinning axis. In some embodiments, suspension systems 20, 30 or 40 may include a pair of one or more arms 21, 31 and 41 respectively, each of the pair of the one or more arms 21, 31 and 41 respectively are coupled to frame 8 (or arm support 37), such that one or more arms 21, 31 and 41 is coupled to an upper portion of frame 8 and one or more arms 21, 31 and 41 is coupled to a bottom portion of frame 8. Such pair of one or more arms, may increase the rigidity of the suspension system, and may reduce the degrees of freedom of the wheel in an axis perpendicular to the spinning axis of the wheel. Such pair of one or more arms, may be movable with respect to frame 8, allowing a vertical movement of the arms, thus suspending a vertical motion of wheel interface 22,34,45. In some embodiments, the pair of one or more arms are coupled to frame using ball joints.

As illustrated and discussed with respect to FIGS. 4A-9E, in another aspect of the invention, suspension systems may include two or more arms respectively and a steering axis may be defined by one or more suspension arms. In such case, steering axis may be a virtual or temporal steering axis having a position defined by two arms when arms are set across each other.

In some embodiments, any one of the suspension systems described elsewhere herein may further include a reference frame 8 adapted to couple the suspension system to the vehicle. In some embodiments, the one or more suspension arms may be coupled to reference frame 8.

In some embodiments, any one of the suspension systems described elsewhere herein may be included in a vehicle (not illustrated). Such a vehicle may include one or more steerable wheels 5a (e.g., 4) each being coupled to one of the suspension systems. In some embodiments, the steering axis may be mobile in a longitudinal direction (e.g., direction 'a') with respect to the vehicle without having an interference between wheel 5a and vehicle platform 8.

In some embodiments, vehicle platform 8 may include a wheel well, wherein steerable wheel 5a is assembled, such that, a lateral distance between the most proximate edge of wheel 5a assembled to the suspension system, and the wheel well is between 0 and 30 cm, for example, 10-20 cm and/or between 0 and 10 cm in a steering position having a steering angle of between 30 and 90 degrees, for example, 30-80, 45-90, and 45-60 degrees in at least one steering direction.

In some embodiments, the vertical size of any one of the suspension systems described elsewhere herein (with respect to the vehicle) may be smaller than the diameter dimension of the wheel.

Figure 3:
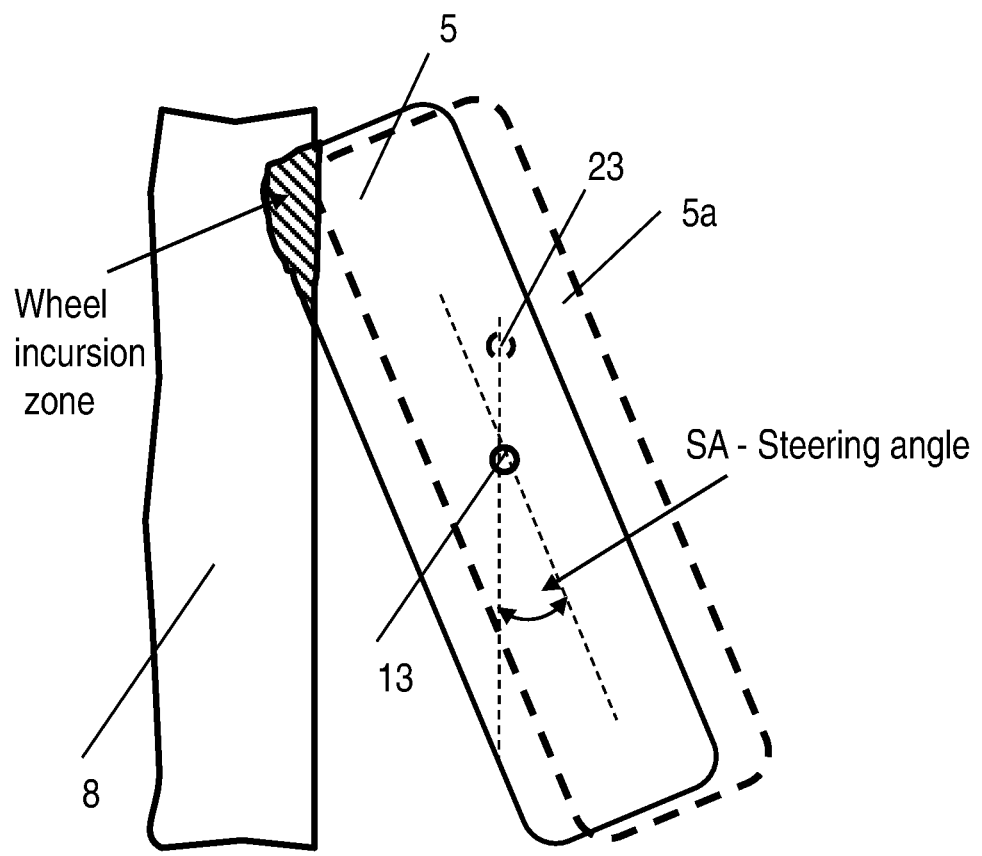
FIG. 3 shows a schematic illustration of a comparison of optional incursion zones of a wheel into a frame of a vehicle between a prior art suspension system and a suspension system according to some embodiments of the invention.

Reference is now made to FIG. 3 which is a schematic top view illustration of a comparison of optional incursion zones (e.g., protruding zone) of a wheel to the vehicle's frame between a prior art suspension system and a suspension system according to some embodiments of the invention. When comparing any one of the suspension systems described elsewhere herein to prior art suspension system 10, one can see that for the same Dw (the lateral distance between reference frame 8 and wheel 5a hub, as illustrated for example in in FIGS. 2A-2C) the maximal steering angle SA of suspension systems 20/30/40 is higher than the maximal SA of suspension system 10. Therefore, for the same Dw an attempt to provide prior art wheel 5 (illustrated also in FIGS. 1A and 1B) and wheel 5a, according to some embodiments of the invention (illustrated and discussed with respect to FIG. 2A), the same steering angle SA may result in the protrusion of wheel 5 connected to prior art suspension system 10 into vehicle frame 8, while wheel 5a connected to suspension system 20 may not protrude vehicle farm 8. The protrusion/incursion zone, illustrated in FIG. 3, may be defined as a virtual area in which the wheel potentially interferes with farm 8 or a reference frame of the suspension system. The ability of steering axis 23/33/43, of suspension systems 20/30/40 according to embodiments of the invention, to move with respect to frame 8 may allow having higher maximal SA than the one allowed using stationary steering axis 13, of prior art system 10, for the same Dw. It should be noted that suspension system discussed elsewhere herein after, provides the same potential advantages over the art as in FIGS. 1A-1B.

In some embodiments, each one suspension systems 20, 30 and/or 40 may include two or more arms 21, 31 and 41 respectively. In such case the two arms 21, 31 and 41 may be configured to move in the vertical direction one with respect to the other. Two arms 21, 31 and 41 may be assembled in two opposite vertical locations (e.g., one above the other) and may be connected to the wheel interfaces, via for example, spherical bearings.

A non-limiting example of a vertical movement of arms is given herein below with respect to FIGS. 6A-6C. The spherical bearings may enable both steering of wheel interface 22, 35 and 45 about mobile steering axis 23, 33 and 43 and displacement of wheel interface 22, 35 and 45 substantially along a vertical axis that is perpendicular to longitudinal axes 'a' (illustrated in FIG. 2A).

Figure 4A:
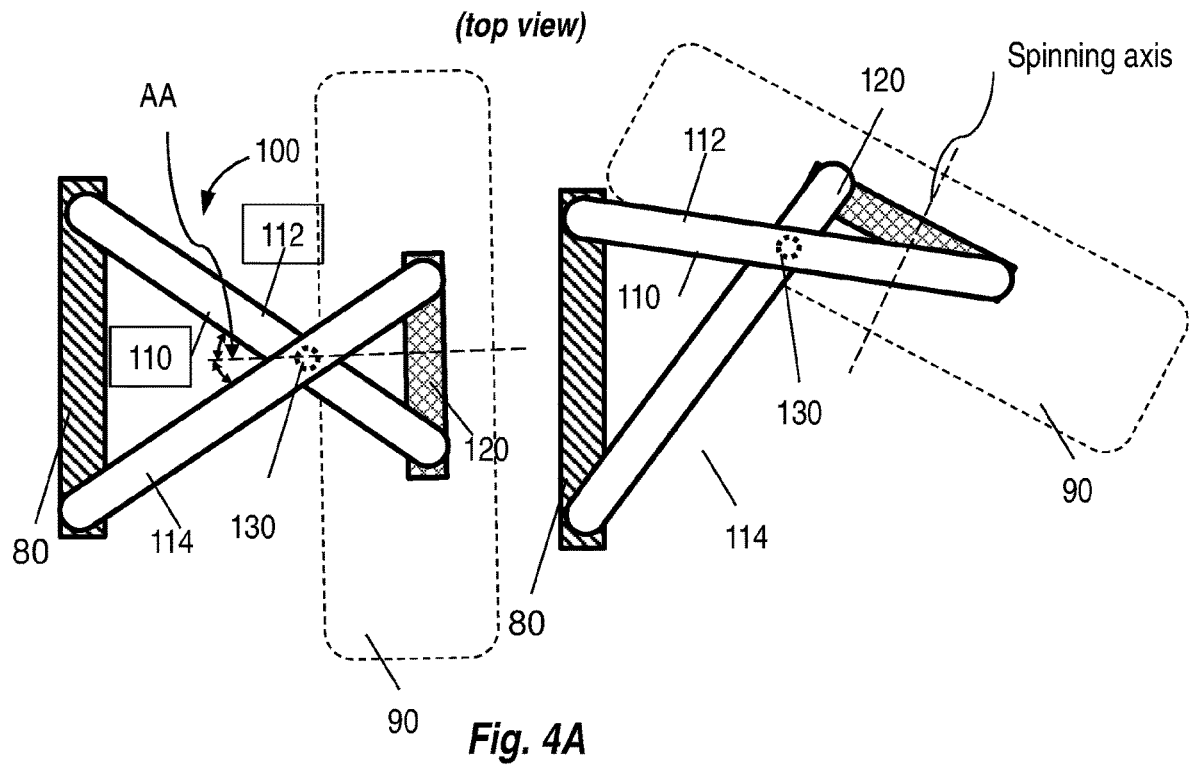
FIGS. 4A and 4B show schematic illustrations of a suspension system, according to some embodiments of the invention.
Figure 4B:
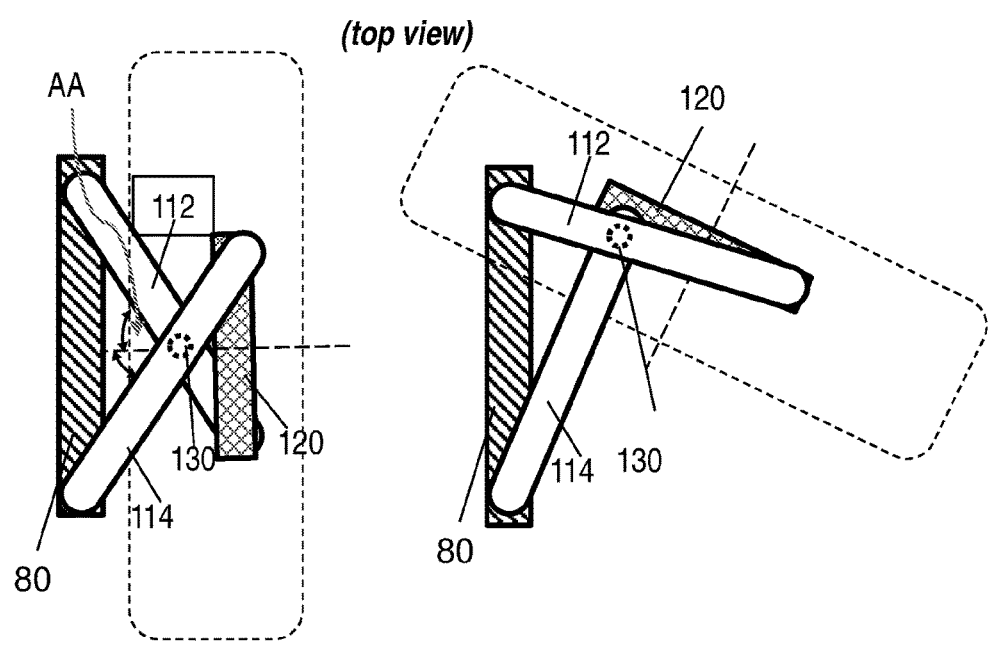

One nonlimiting example of a system such as suspension system is given in FIGS. 4A and 4B which show schematic top view illustrations of a suspension system and wheel of a vehicle coupled to the suspension system, according to some embodiments of the invention.

According to some embodiments, suspension system 100 may include at least one pair of arms 110 and a wheel interface 120. Pair of arms 110 may include a first arm 112 and a second arm 114. First arm 112 and second arm 114 may be set across each other and define a steering axis 130 (e.g., virtual mobile steering axis) at a virtual intersection therebetween such that steering axis 130 may move with respect to reference frame 80 (e.g., in the longitudinal direction) when wheel interface 120 changes its steering angle relative to reference frame 80. Such a longitudinal movement is demonstrated by change in the position of axis 130 with respect to frame 80 between the right and left illustrations of FIG. 4A. In some embodiments, mobile steering axis 130 may move in a longitudinal direction with respect to the spinning axis of a wheel 90 of the vehicle.

Another nonlimiting example for suspension system 100, is given herein below with respect to FIGS. 5A-5D.

A suspension system according to embodiments of the invention may allow a wheel such as wheel 5a to be steered at a maximal steering angle of up to 90° without incursion to reference frame 80 as illustrated in FIG. 4A. In some embodiments, suspension system 100 may provide a vehicle with a maximal steering angle, in at least one steering direction, of between 30 and 90 degrees, for example, 30-80, 45-90, and 45-60 degrees.

For lower maximal steering angle, the length of first arm 112 and second arm 114 may be reduced, as illustrated in FIG. 4B, allowing wider space between each pair of wheels 90 of a vehicle (e.g. pair of front wheels, pair of rear wheels). In some embodiments, suspension system 100 may allow to reduce the lateral distance of the wheel outside the vehicle. In some embodiments, vehicle platform 80 may include a wheel well wherein steerable wheel 90 is assembled, such that, a lateral distance between the most proximate edge of wheel 90 and the wheel well is between 0 and 30 cm, for example, 10-20 cm and/or 0-10 cm.

In some embodiments an angle AA may be defined between arm 112 and/or arm 114 and wheel rotation axis (spinning axis) in un-steered position.

Decreasing angle AA may increase potential maximal steering angle SA without an incursion of the wheel into the platform.

Increasing Dkp, e.g. by longer suspension arms (e.g. by increasing the length of the arms), increases potential maximal SA angle without incursion of the wheel into the platform because the wheel is placed at a bigger lateral distance from the vehicle platform.

A suspension system according to embodiments of the invention (e.g., systems 20, 30, 40 and 100) may provide better relations between SA and Dkp and SA and Dw in comparison to prior art suspension systems. For the same SA angle a vehicle suspension systems 20, 30, 40 and 100 may have smaller Dw and Dkp in comparison to prior art suspension systems (e.g., system 10) which can be translated into a larger cabin space, and/or the outer lateral size (width) of the vehicle between wheels. For the same Dw and Dkp, a larger maximal steering SA angle can be provided by suspension systems 20, 30, 40 and 100 in comparison to prior art systems (e.g., system 10) making the vehicle more maneuverable.

Figure 5A:
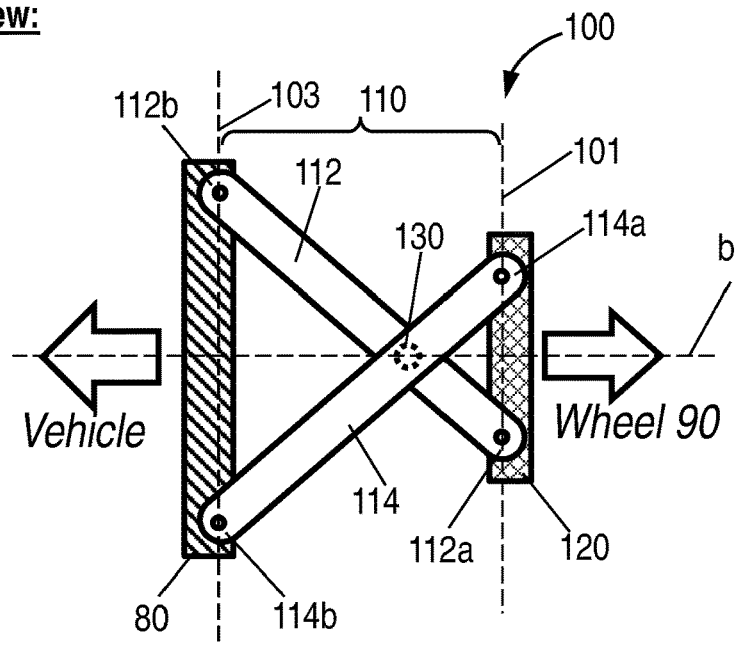
FIGS. 5A, 5B and 5C are schematic illustrations of a suspension system for a wheel of a vehicle, according to some embodiments of the invention.

In some embodiments, the movable steering axis may refer to a virtual line connecting the momentary cross section point of an upper pair of arms (e.g. arms 512 and 514 of FIG. 5A) with the momentary cross section point of a lower pair of arms (e.g. arms 522 and 524 of FIG. 5A) of a suspension system such as suspension system 500 of FIG. 5A.

Figure 5B:
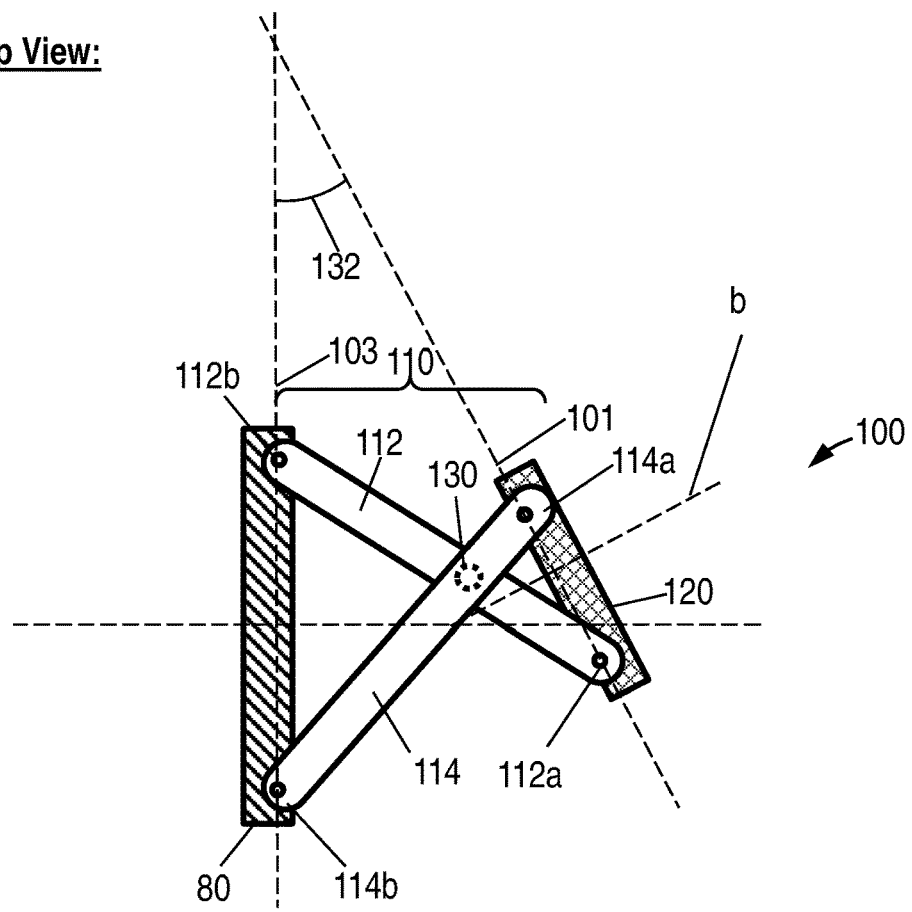
Figure 5C:
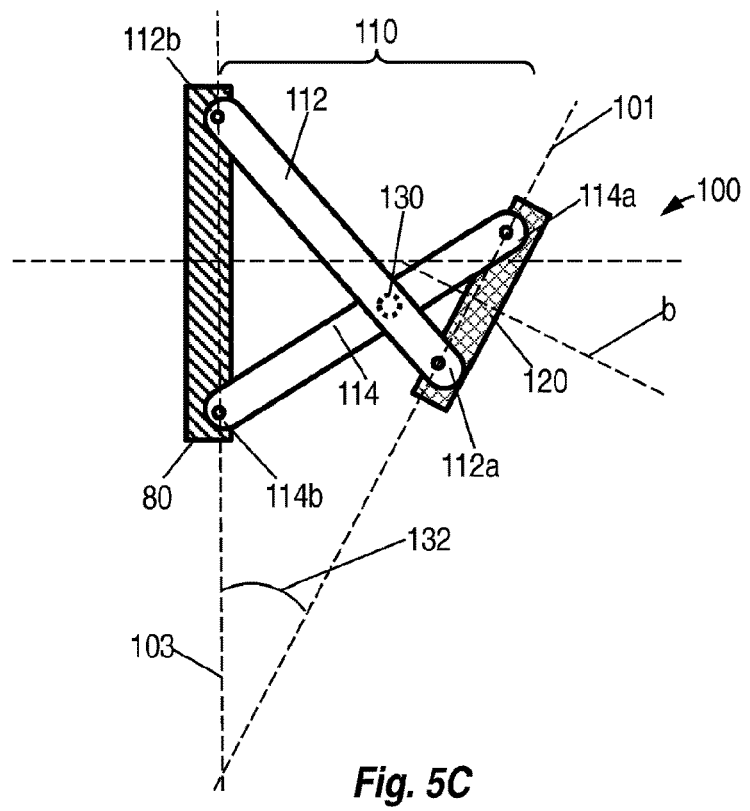

Reference is now made to FIGS. 5A, 5B and 5C, which are schematic illustrations of a suspension system 100 for a wheel of a vehicle, according to some embodiments of the invention.

Figure 5D:
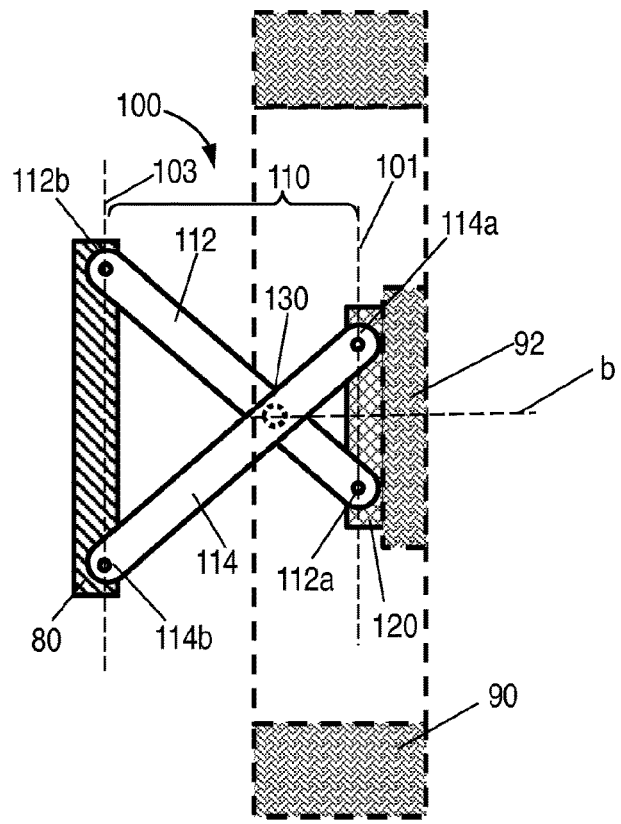
FIG. 5D is a schematic illustration of a suspension system of FIGS. 5A-5C with the wheel, according to some embodiments of the invention.

Reference is also made to FIG. 5D, which is a schematic illustration of a suspension system 100 for a wheel of a vehicle assembled within the wheel, according to some embodiments of the invention.

FIGS. 5A, 5B and 5C show a top view of suspension system 100 for different steering angles 132, 132' of a wheel interface 120. FIG. 5D shows a top view of suspension system 100 assembled within wheel 90. In some embodiments, maximal steering angle 132 or 132' in at least one steering direction may be between 45 and 90 degrees, for example, between 45 and 70 degrees, or between 60 and 90 degrees.

According to some embodiments, suspension system 100 may include at least one pair of arms 110 and a wheel interface 120. For example, FIGS. 5A, 5B, 5C and 5D show suspension system 100 with one pair 110 of arms. In some embodiments, the suspension system may include more than one pair of arms (e.g., as described below with respect to FIGS. 6A-6D, FIG. 7, FIG. 8 and FIGS. 9A-9E). Wheel interface 120 may be adapted to be connected to wheel 90 of the vehicle (e.g. as shown in FIG. 5D).

Pair of arms 110 may include a first arm 112 having a first end 112a and a second end 112b and a second arm 114 having a first end 114a and a second end 114b. First end 112a of first arm 112 and first end 114a of second arm 114 may be rotatably connected to wheel interface 120 along, for example, a first longitudinal axis 101. Second end 112b of first arm 112 and second end 114b of second arm 114 may be adapted to be rotatably connected to a reference frame 80 (e.g., vehicle frame) of the vehicle along, for example, a second longitudinal axis 103.

First arm 112 and second arm 114 may be set across each other and define a steering axis 130 (e.g., virtual mobile steering axis) at a virtual intersection therebetween such that mobile steering axis 130 may move with respect to reference frame 80 when wheel interface 120 changes its steering angle (132) relative to reference frame 80.

For example, steering axis 130 may move substantially in a direction that is parallel to second longitudinal axis 103 when the steering angle of wheel interface 120 changes (e.g., as shown in FIGS. 5A-5C). In some embodiments, second longitudinal axis 103 may be substantially parallel (e.g., deviated in up to 2°) to the longitudinal axis of the vehicle. However, mobile steering axis 130 may also move in a direction that is perpendicular to second longitudinal axis 103. In general, the movement of mobile steering axis 130 may be dictated by the length of first arm 112 and second arm 114 and the location of the rotatable connections of first arm 112 and second arm 114 to reference frame 80 and/or wheel interface 120.

In some embodiments, a movement ratio defined between a transformation of steering axis 130 in parallel to longitudinal axis 103 or the longitudinal axis of the vehicle and a transformation of steering axis 130 in a lateral direction is higher than 5, for example, higher than, 8, 10 or more.

In some embodiments, the movement of steering axis 130 is non-continuous, when changing steering angle 132. In some embodiments, the movement of steering axis 130 may be conducted continuously or in intermittent way. The intermittent way may include a plurality of either equal or nonequal steps.

In this manner, the protrusion (or incursion) of wheel 90 into a cabin of the vehicle may be significantly reduced as compared to current suspension systems having stationary steering axis. For example, the protrusion of wheel 90 into a space which can be used by the cabin of the vehicle may be reduced by at least 10-20% when using suspension system according to embodiments of the invention, as compared to, for example, an equivalent "double wishbone" suspension system with a stationary steering axis According to some embodiments, the rotatable connections between first arm 112, second arm 114, wheel interface 120 and reference frame 80 at respective ends of the arms thereof may be using spherical bearings. The spherical bearings may enable both steering of wheel interface 120 about mobile steering axis 130 (e.g., as shown in FIGS. 5B and 5C) and displacement of wheel interface 120 substantially along a vertical axis that is perpendicular to longitudinal axes 101, 103 (e.g., due to a contact of the wheel with the road).

According to various embodiments, the lengths and/or the locations of the rotatable connections of first arm 112 and second arm 114 to wheel interface 120 and reference frame 80 may be selected according to applications of suspension system 100.

In some embodiments, the wheel interface 120 may allow spinning wheel 90 about a spinning axis (e.g., spinning axis 'b' illustrated in FIG. 5A-5D), such that first ends 112a and 114a of at least one pair of arms 110 are positioned between spinning axis 'b' and the rim of the wheel 90, illustrated in FIG. 5D. In some embodiments, the wheel interface 120 may allow spinning wheel 90 about a spinning axis (e.g., spinning axis 'b' illustrated in FIG. 5A-5D), such that second ends 112b and 114b of at least one pair of arms 110 are positioned between spinning axis 'b' and the rim of the wheel 90, illustrated in FIG. 5D. In some embodiments, wheel interface 120 may allow spinning wheel 90 about the spinning axis, such that a virtual intersection of at least one pair of arms 110 may be positioned between spinning axis 'b' and the rim of wheel 90.

In some embodiments, wheel interface 120 may allow spinning wheel 90 about spinning axis 130, such that a distance between steering axis 130 and spinning axis 'b' increases when increasing the steering angle in at least one direction.

Figure 6A:
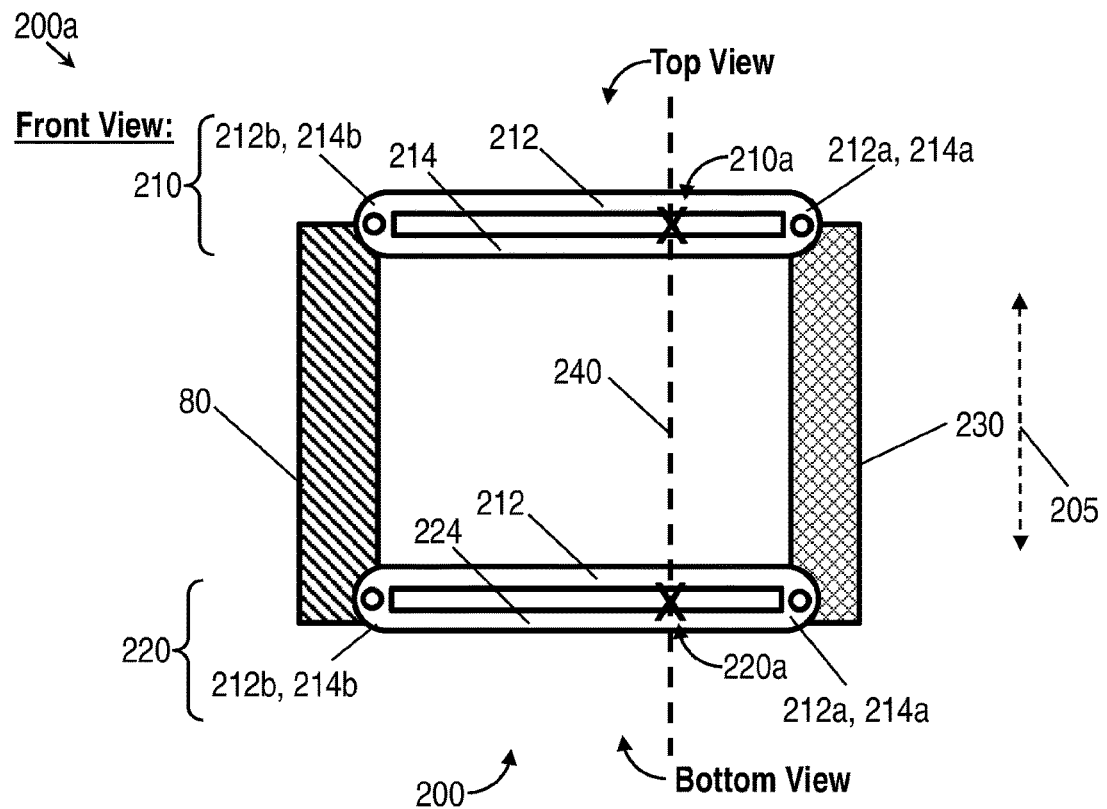
FIGS. 6A, 6B and 6C are schematic illustrations of suspension systems of a wheel of a vehicle and including each two pairs of arms, according to some embodiments of the invention.
Figure 6A:
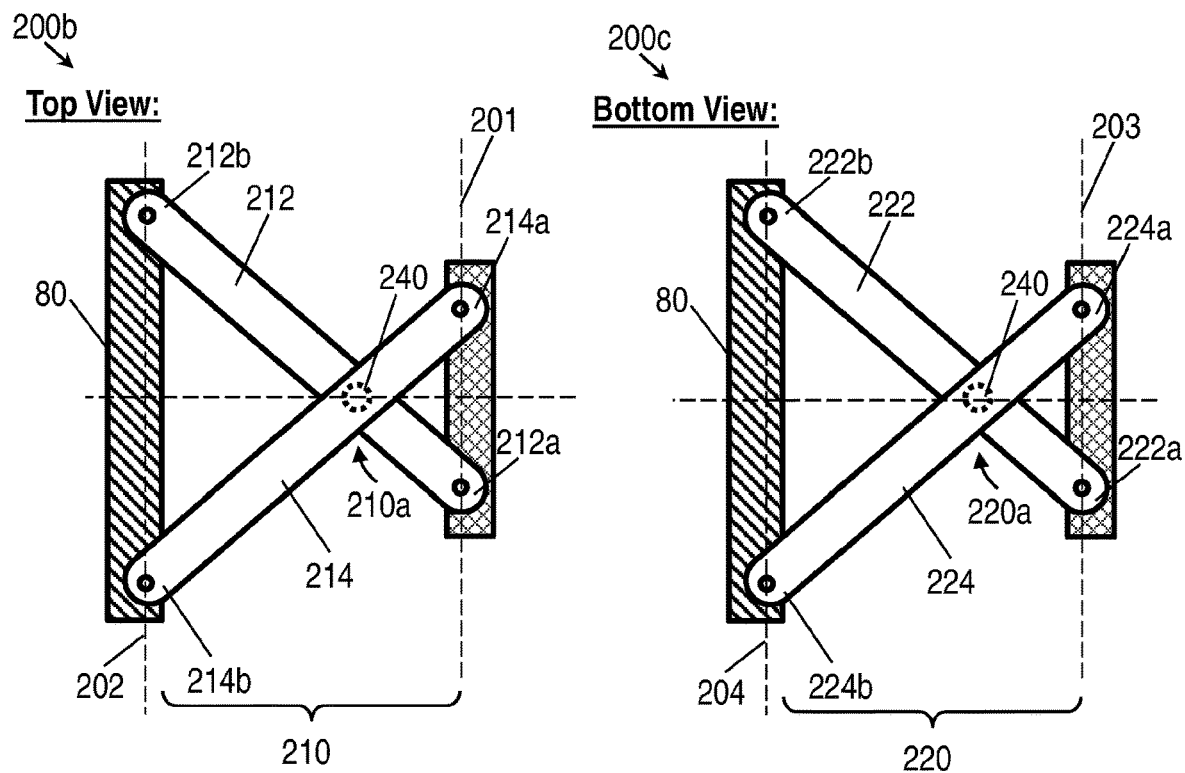
Figure 6B:
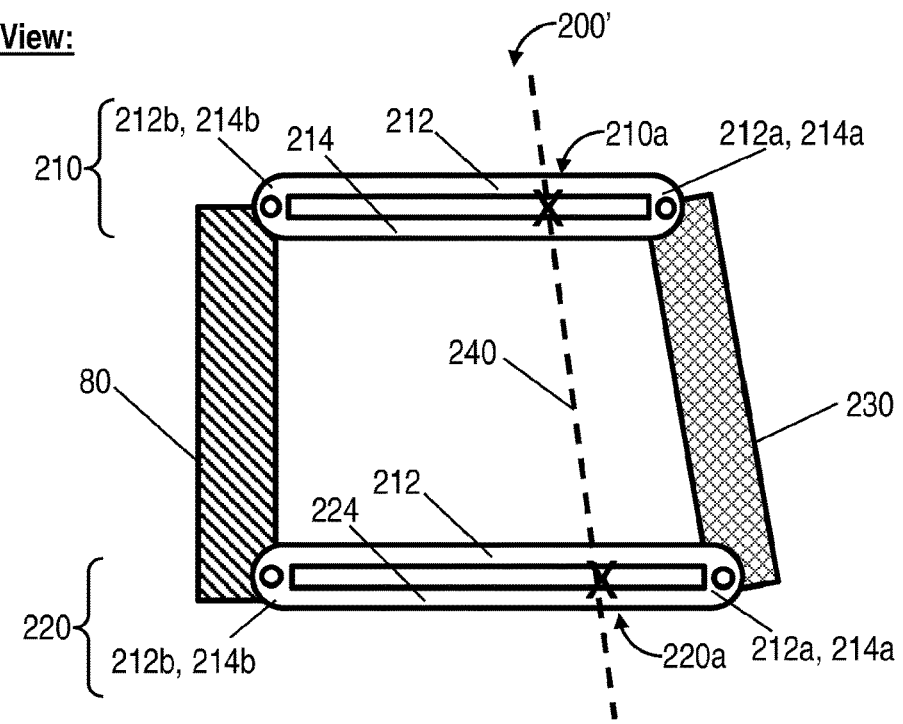
Figure 6C:
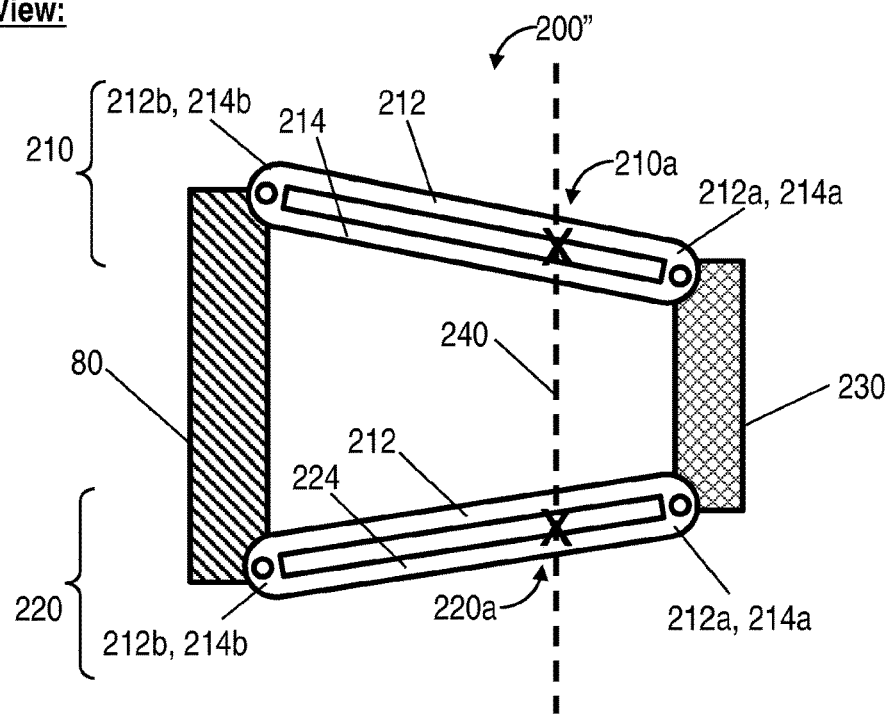

Reference is now made to FIGS. 6A, 6B and 6C, which are schematic illustrations of suspension systems 200, 200', 200" of a wheel of a vehicle, respectively, and including each two pairs 210, 220 of arms, according to some embodiments of the invention.

Figure 6D:
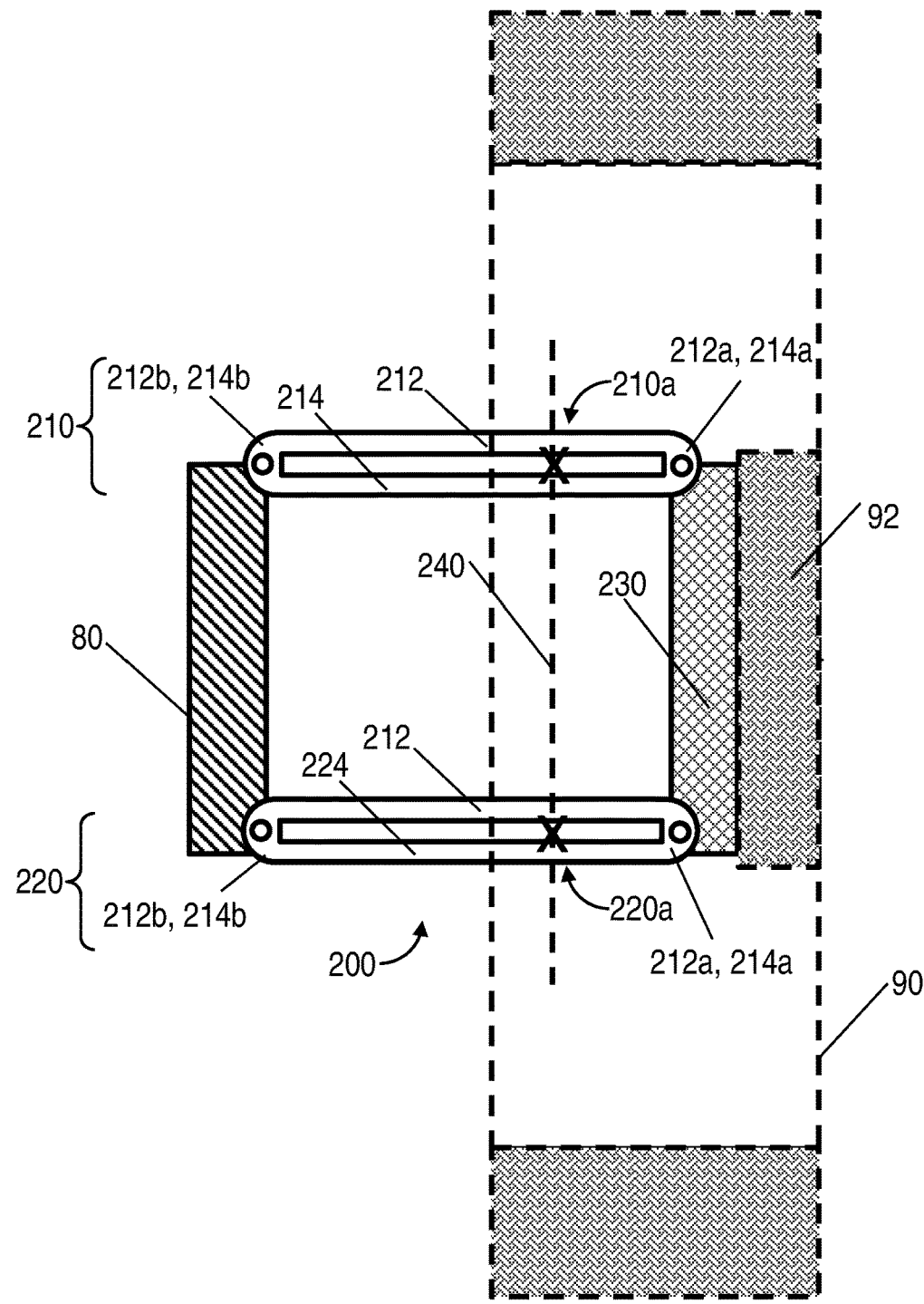
FIG. 6D is a schematic illustration of a suspension system of FIGS. 6A-6C with the wheel, according to some embodiments of the invention.

Reference is also made to FIG. 6D, which is a schematic illustration of a suspension system 200 for a wheel of a vehicle and including two pairs 210, 220 of arms assembled within the wheel, according to some embodiments of the invention.

Illustrations 200a, 200b and 200c in FIG. 6A show a front view, a top view and a bottom view, respectively, of suspension system 200. FIGS. 6B and 6C show a front view of suspension systems 200', 200". FIG. 6D shows a front view of suspension system 200 with assembled wheel 90.

According to some embodiments, suspension system 200 may include a first pair 210 of arms, a second pair 220 of arms and a wheel interface 230.

Each of first pair 210 of arms and second pair 220 of arms may be like pair 110 of arms described above with respect to FIGS. 5A-5D. Wheel interface 230 may be like wheel interface 120 described above with respect to FIGS. 5A-5D.

First pair of arms 210 may include a first arm 212 and a second arm 214 set across each other (e.g., as shown in illustration 200b in FIG. 6A). Each of first arm 212 and second arm 214 may be rotatably connected at its first end 212a, 214a, respectively, to wheel interface 230 along a first longitudinal axis 201 and at its second end 212b, 214b, respectively, to reference frame 80 of the vehicle along a second longitudinal axis 202.

Second pair 220 of arms may include a third arm 222 and a fourth arm 224 set across each other (e.g., as shown in illustration 200c in FIG. 6A). Each of third arm 222 and fourth arm 224 may be rotatably connected at its first end 222a, 224a, respectively, to wheel interface 230 along a third longitudinal axis 203 and at its second end 222b, 224b, respectively, to reference frame 80 along a fourth longitudinal axis 204.

A virtual intersection 210a between first arm 212 and second arm 214 of first pair 210 (e.g., as shown in illustration 200b in FIG. 6A) and a virtual intersection 220a between third arm 222 and fourth arm 224 of second pair 220 (e.g., as shown in illustration 200c in FIG. 6A) may define a mobile steering axis 240 (e.g., like mobile steering axis 130 described above with respect to FIGS. 5A-5D) that may move with respect to reference frame 80 when wheel interface 230 changes its steering angle with respect to reference frame 80 (e.g., as described above with respect to FIGS. 5B and 5C).

According to some embodiments, the rotatable connections between first arm 212, second arm 214, third arm 222 and fourth arm 224, wheel interface 230 and reference frame 80 at respective ends of the arms thereof may be using, for example, spherical bearings. The spherical bearings may enable both steering of wheel interface 230 about mobile steering axis 240 and displacement of wheel interface 230 substantially along a vertical axis 205 that is perpendicular to longitudinal axes 201, 202, 203, 204 (e.g., as shown in FIG. 6A).

According to various embodiments, the lengths of first arm 212, second arm 214, third arm 222 and fourth arm 224 and/or the locations of the rotatable connections of first arm 212, second arm 214, third arm 222 and fourth arm 224 to wheel interface 230 and/or reference frame 80 may be selected according to applications of suspension system 200.

For example, FIG. 6A shows an embodiment of suspension system 200 wherein first arm 212, second arm 214, third arm 222 and fourth arm 224 have the same length and wherein first arm 212 is parallel to third arm 222 and second arm 214 is parallel to fourth arm 224.

In another example, FIG. 6B shows an embodiment of suspension system 200' wherein the length of first arm 212 and second arm 214 is smaller as compared to the length of third arm 222 and fourth arm 224. In this manner suspension system 200 may be capable of providing positive or negative camber angle and/or inclined mobile steering axis 240.

In another example, FIG. 6C shows an embodiments of suspension system 200" wherein first pair 210 of arms and second pair 220 of arms are not parallel with respect to each other. In embodiments shown in FIG. 6C, first pair 210 of arms and second pair 220 are arranged to form a tapered shape in a lateral direction extending from reference frame 80 towards wheel interface 230.

It is noted that other embodiments of suspension systems 200, 200', 200" are also possible.

Figure 7:
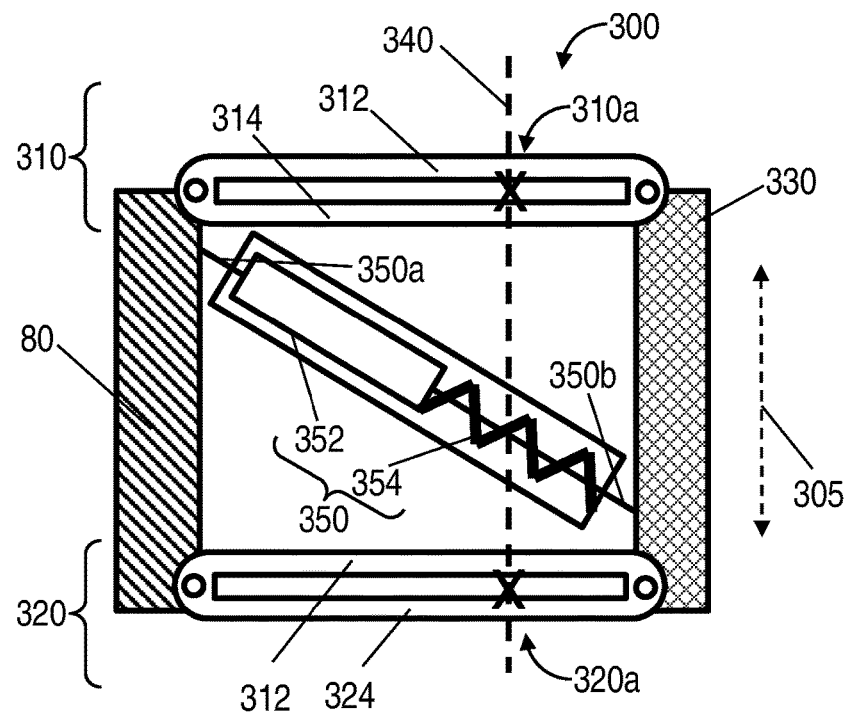
FIG. 7 is a schematic illustration of a suspension system for a wheel of a vehicle and including a shock absorption and springing means, according to some embodiments of the invention.

Reference is now made to FIG. 7, which is a schematic illustration of a suspension system 300 for a wheel of a vehicle and including a shock absorption and springing means 350, according to some embodiments of the invention.

According to some embodiments, suspension system 300 may include a first pair 310 of arms, a second pair 320 of arms, a wheel interface 330 and a shock absorption and springing means 350.

First pair 310 of arms may be like first pair 210 of arms or pair 110 of arms and second pair 320 of arms may be like second pair 220 of arms or pair 110 of arms described above with respect to FIGS. 6A-6D and FIGS. 5A-5D, respectively. Wheel interface 330 may be like wheel interface 230 or wheel interface 120 described above with respect to FIGS. 6A-6D and FIGS. 5A-5D, respectively.

First pair 310 of arms may include a first arm 312 and a second arm 314 set across each other to provide a virtual intersection 310a therebetween. Each of first arm 312 and second arm 314 may be rotatably connected at its first end to wheel interface 330 and at its second end to reference frame 80 of the vehicle.

Second pair 320 of arms may include a third arm 322 and a fourth arm 334 set across each other to provide a virtual intersection 320a therebetween. Each of third arm 322 and fourth arm 324 may be rotatably connected at its first end to wheel interface 330 and at its second end to reference frame 80 of the vehicle.

Virtual intersection 310a and virtual intersection 320a may define a mobile steering axis 340 (e.g., like mobile steering axis 240 or mobile steering axis 130 described above with respect to FIGS. 6A-6D and FIGS. 5A-5D, respectively) that may move with respect to reference frame 80 when wheel interface 330 changes its steering angle with respect to reference frame 80 (e.g., as described above with respect to FIGS. 5B and 5C).

According to some embodiments, the rotatable connections between first arm 312, second arm 314, third arm 322 and fourth arm 324, wheel interface 330 and reference frame 80 at respective ends of the arms thereof may be using, for example, spherical bearings. The spherical bearings may enable both steering of wheel interface 330 about mobile steering axis 340 and displacement of wheel interface 330 substantially along a vertical axis 305 of suspension system 300.

According to some embodiments, shock absorption and springing means 350 may include a telescopic damper 352 loaded with a spring 354. Shock absorption and springing means 350 may adapted to be rotatably connected at its first end 350a to a sprung mass (e.g., reference frame 80) and at its second end 350b to an un-sprung mass (e.g., wheel interface 330).

Shock absorption and springing means 350 may be adapted to damp motions and to support a weight of the vehicle along vertical axis 305 (or substantially along vertical axis 305) of suspension system 300 while enabling steering of wheel interface 350.

Figure 8:
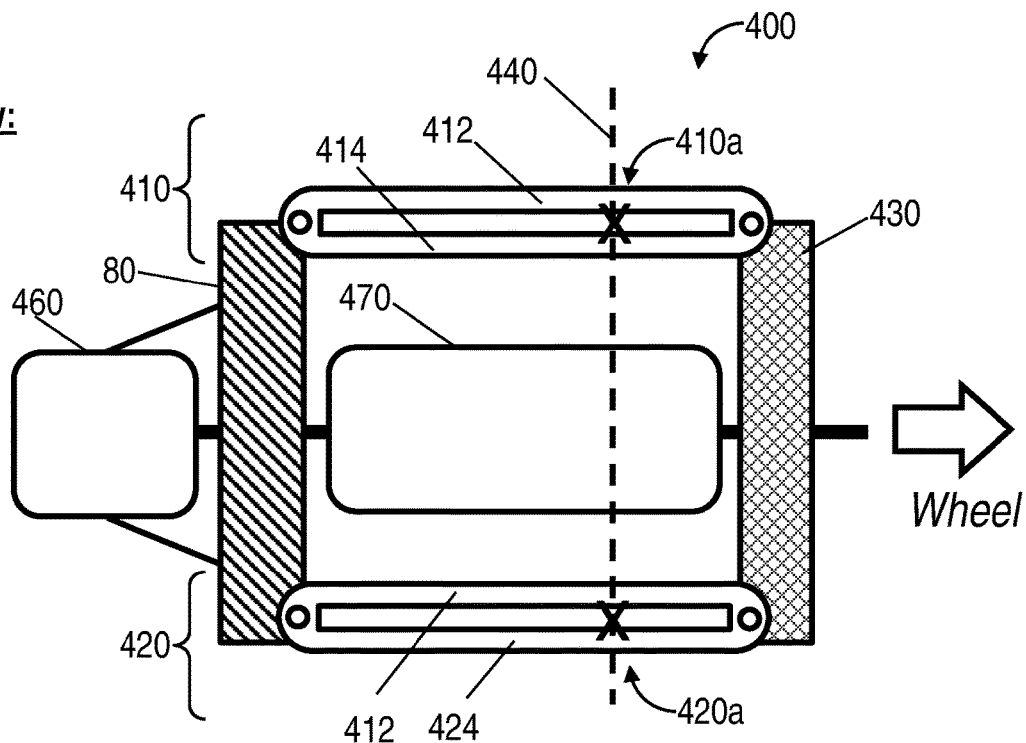
FIG. 8 is a schematic illustration of a suspension system adapted to operate with a motor and a transmission assembly, according to some embodiments of the invention.

Reference is now made to FIG. 8, which is a schematic illustration of a suspension system 400 adapted to operate with a motor 460 and a transmission assembly 470, according to some embodiments of the invention.

According to some embodiments, suspension system 400 may include a first pair 410 of arms, a second pair 420 of arms and a wheel interface 430.

First pair 410 of arms may be like first pair 310 of arms, first pair 210 of arms or pair 110 of arms and second pair 420 of arms may be like second pair 320 of arms, second pair 210 of arms or pair 110 of arms described above with respect to FIG. 7 and FIGS. 6A-6D and FIGS. 5A-5D, respectively. Wheel interface 430 may be like wheel interface 330, wheel interface 230 or wheel interface 120 described above with respect to FIG. 3, FIGS. 6A-6D and FIGS. 5A-5D, respectively.

First pair 410 of arms may include a first arm 412 and a second arm 414 set across each other to provide a virtual intersection 410a therebetween. Each of first arm 412 and second arm 414 may be rotatably connected at its first end to wheel interface 430 and at its second end to reference frame 80 of the vehicle.

Second pair 420 of arms may include a third arm 422 and a fourth arm 434 set across each other to provide a virtual intersection 420a therebetween. Each of third arm 422 and fourth arm 424 may be rotatably connected at its first end to wheel interface 430 and at its second end to reference frame 80 of the vehicle.

Virtual intersection 410a and virtual intersection 420a may define a mobile steering axis 440 (e.g., like mobile steering axis 340, mobile steering axis 240, mobile steering axis 120 described above with respect to FIG. 3, FIGS. 6A-6D and FIGS. 5A-5D, respectively). Mobile steering axis 440 may move with respect to reference frame 80 when wheel interface 430 changes its steering angle with respect to reference frame 80 (e.g., as described above with respect to FIGS. 5B and 5C).

According to some embodiments, suspension system 400 may be adapted to operate with a motor 460 and a transmission assembly 470. Motor 460 may be a rotation motor adapted to generate a torque force capable of rotating the wheel of the vehicle. Motor 460 may be coupled to the wheel via transmission assembly 470. Transmission assembly 470 may be adapted to transmit rotations generated by motor 460 to the wheel of the vehicle while enabling steering of wheel interface 430. In other embodiments, torque force may be transmitted to the wheel from a half-shaft (not shown) using transmission assembly 470.

Figure 9A:
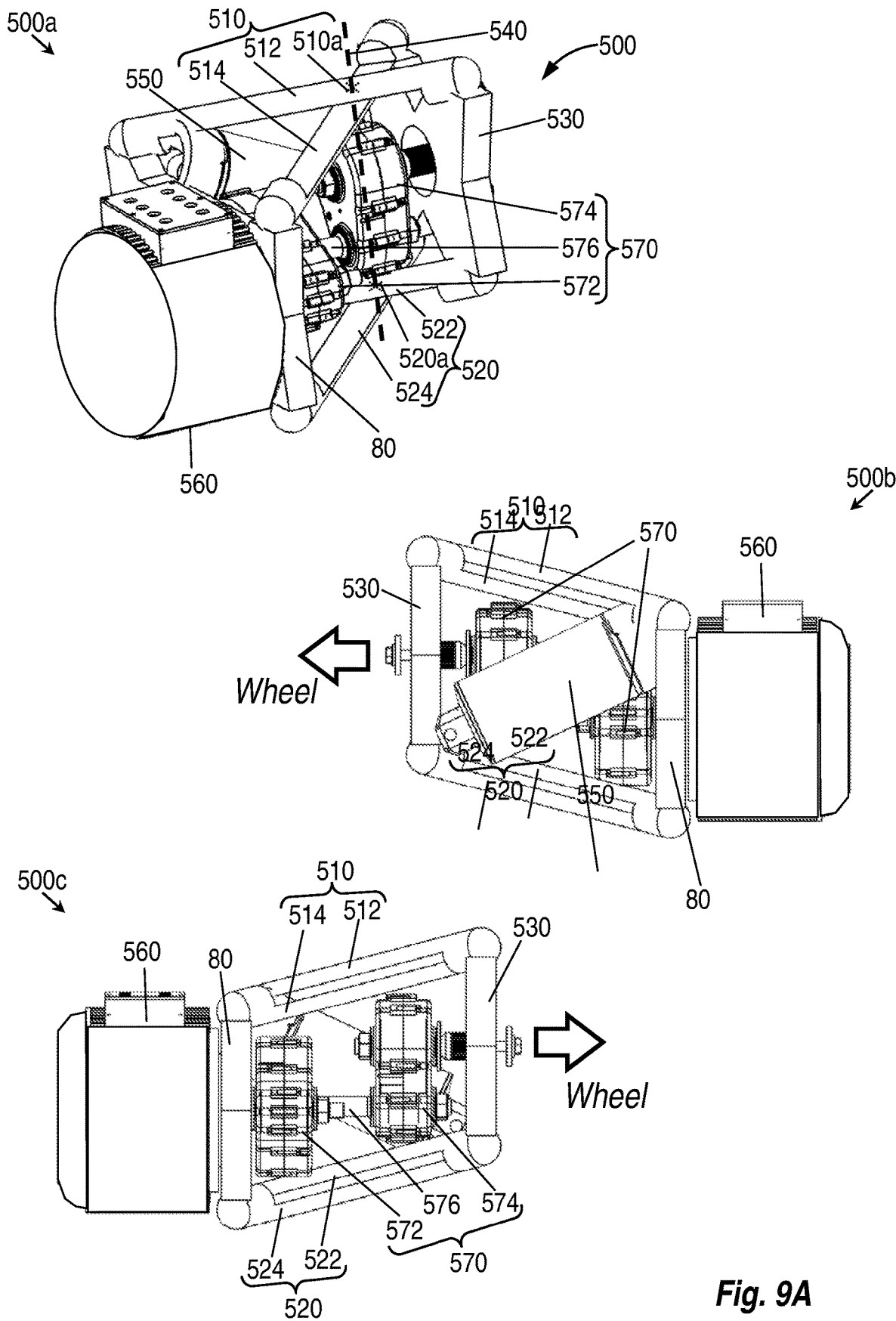
FIG. 9A is a schematic illustration of a suspension system for a wheel of a vehicle, according to some embodiments of the invention.

Reference is now made to FIG. 9A, which is a schematic illustration of a more detailed aspect of a suspension system 500 for a wheel of a vehicle, according to some embodiments of the invention.

Figure 9B:
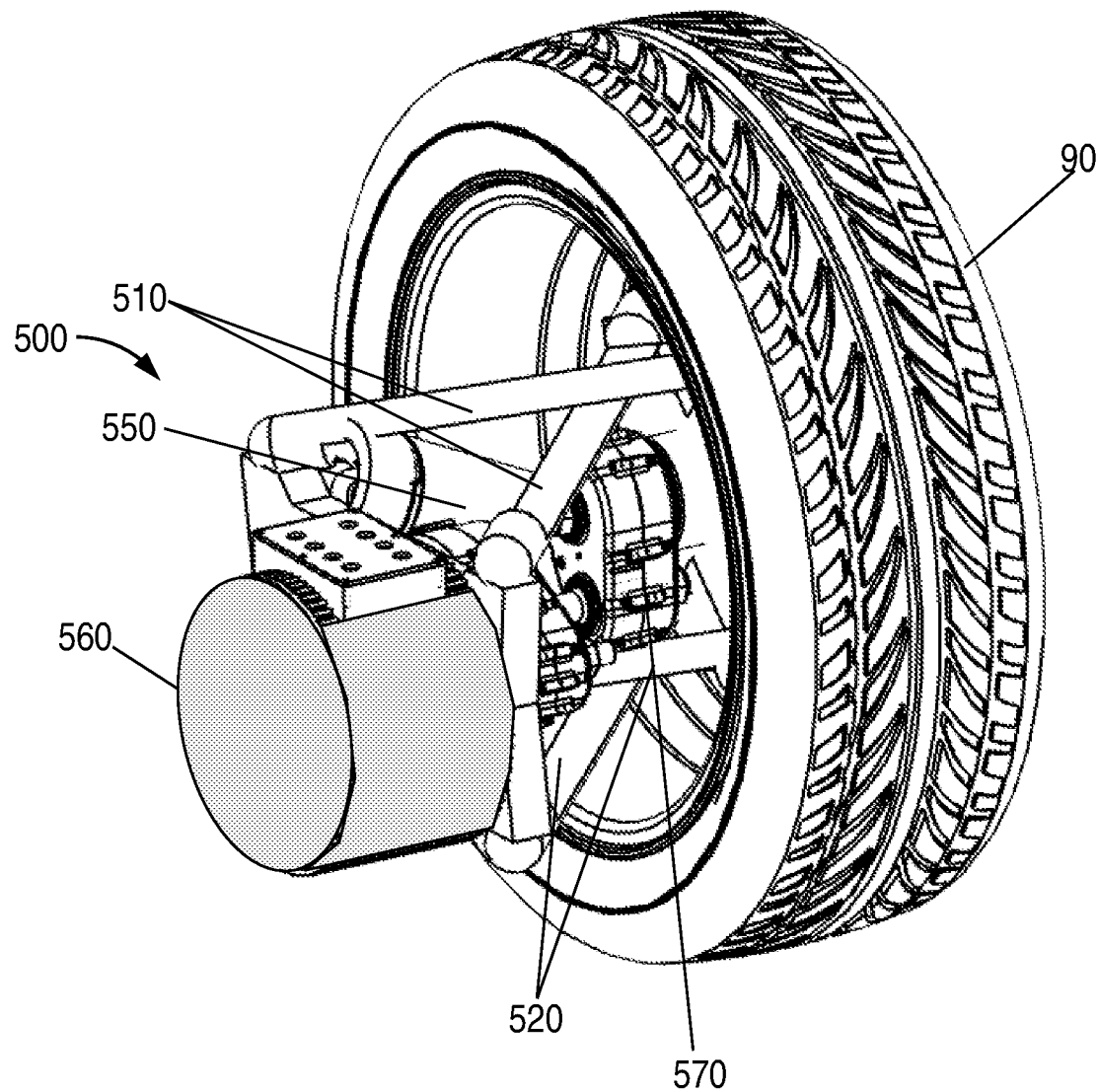
FIG. 9B is a schematic illustration of a suspension system and a wheel of a vehicle, according to some embodiments of the invention.

Reference is also made to FIG. 9B, which is a schematic illustration of a more detailed aspect of a suspension system 500 for a wheel of a vehicle assembled within the wheel, according to some embodiments of the invention.

Illustrations 500a, 500b and 500c in FIG. 9A show a perspective view, a front view and a rear view of suspension system 500, respectively. FIG. 5B shows a perspective view of suspension system 500 assembled within wheel 90.

According to some embodiments, suspension system 500 may include a first pair 510 of arms, a second pair 520 of arms, a wheel interface 530 and shock absorption and springing means 550.

First pair 510 of arms may be like first pair 410 of arms, first pair 310 of arms, first pair 210 of arms or pair 110 of arms and second pair 520 of arms may be like second pair 420 of arms, second pair 320 of arms, second pair 210 of arms or pair 110 of arms described above with respect to FIG. 8, FIG. 7 and FIGS. 6A-6D and FIGS. 5A-5D, respectively. Wheel interface 530 may be like wheel interface 430, wheel interface 330, wheel interface 230 or wheel interface 120 described above with respect to FIG. 8, FIG. 7, FIGS. 6A-6D and FIGS. 5A-5D, respectively.

First pair 510 of arms may include a first arm 512 and a second arm 514 set across each other to provide a virtual intersection 510a therebetween. Each of first arm 512 and second arm 514 may be rotatably connected at its first end to wheel interface 530 and at its second end to reference frame 80 of the vehicle.

Second pair 520 of arms may include a third arm 522 and a fourth arm 534 set across each other to provide a virtual intersection 520a therebetween. Each of third arm 522 and fourth arm 524 may be rotatably connected at its first end to wheel interface 530 and at its second end to reference frame 80 of the vehicle.

Virtual intersection 510a and virtual intersection 520a may define a mobile steering axis 540 (e.g., like mobile steering axis 440, mobile steering axis 340, mobile steering axis 240, mobile steering axis 120 described above with respect to FIG. 8, FIG. 7, FIGS. 6A-6D and FIGS. 5A-5D, respectively). Mobile steering axis 540 may move with respect to reference frame 80 when wheel interface 430 changes its steering angle with respect to reference frame 80 (e.g., as described above with respect to FIGS. 5B and 5C).

According to some embodiments, the rotatable connections between first arm 512, second arm 514, third arm 522 and fourth arm 524, wheel interface 530 and reference frame 80 at respective ends of the arms thereof may be using, for example, spherical bearings. The spherical bearings may enable both steering of wheel interface 530 about mobile steering axis 540 and displacement of wheel interface 530 substantially along a vertical axis 505 of suspension system 300.

According to some embodiments, shock absorption and springing means 550 may be like shock absorption and springing means 350 described above with respect to FIG. 7. Shock absorption and springing means 550 may adapted to be rotatably connected at its first end to, for example, reference frame 80 and at its second end to, for example, wheel interface 530. Shock absorption and springing means 550 may be adapted to damp motions and to support a weight of the vehicle along vertical axis 505 (or substantially along vertical axis 305) of suspension system 500 while enabling steering of wheel interface 550.

According to some embodiments, suspension system 500 may be adapted to operate with a motor 560 and a transmission assembly 570.

According to some embodiments, motor 560 may be like motor 460 described above with respect to FIG. 8 and transmission assembly 570 may be like transmission assembly 470 described above with respect to FIG. 8.

Motor 560 may be coupled to, for example, reference frame 80. Motor 560 may be a rotation motor adapted to generate a torque force capable of rotating the wheel of the vehicle. Motor 560 may be coupled to the wheel via transmission assembly 570.

Transmission assembly 570 may, for example, include a first gearing mechanism 572 coupled to a second gearing mechanism 574 using a rotatable rod 576 (e.g., as shown in FIG. 9A). Transmission assembly 570 may be adapted to transmit rotations generated by motor 560 to the wheel of the vehicle while enabling steering of wheel interface 530.

Figure 9C:
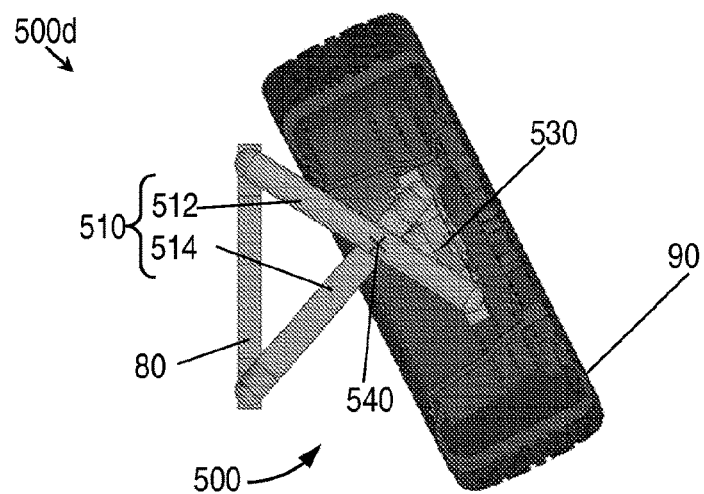
FIG. 9C is a schematic illustration of a suspension system and a wheel, showing steering capabilities of the suspension system, according to some embodiments of the invention.
Figure 9C:
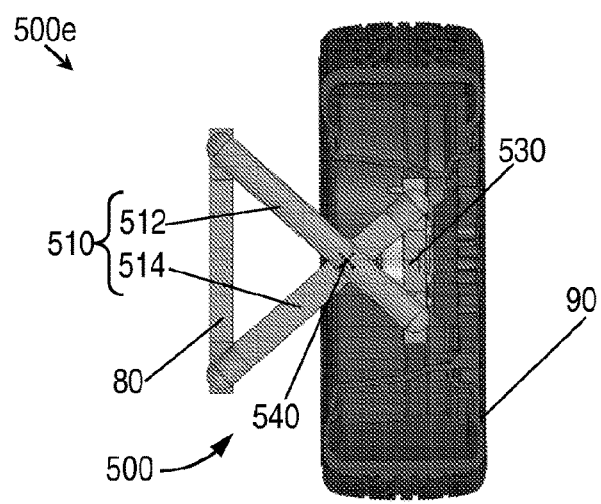
Figure 9C:
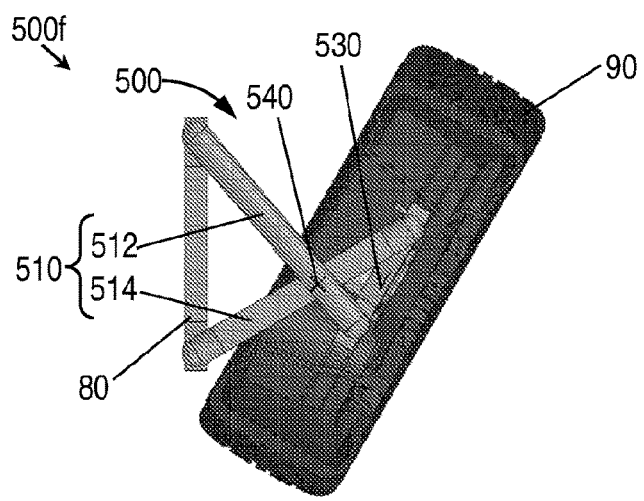

Reference is now made to FIG. 9C, which is a schematic illustration of a more detailed aspect of a suspension system 500 assembled within a wheel and showing steering capabilities of suspension system 500, according to some embodiments of the invention.

Illustrations 500d, 500e, 500f in FIG. 9C show a top view of suspension system 500 and wheel 90 for different steering angles of wheel interface 530. FIG. 9C does not show shock absorption and springing means 550, motor 560 and transmission assembly 570 for sake of clarity.

Figure 9D:
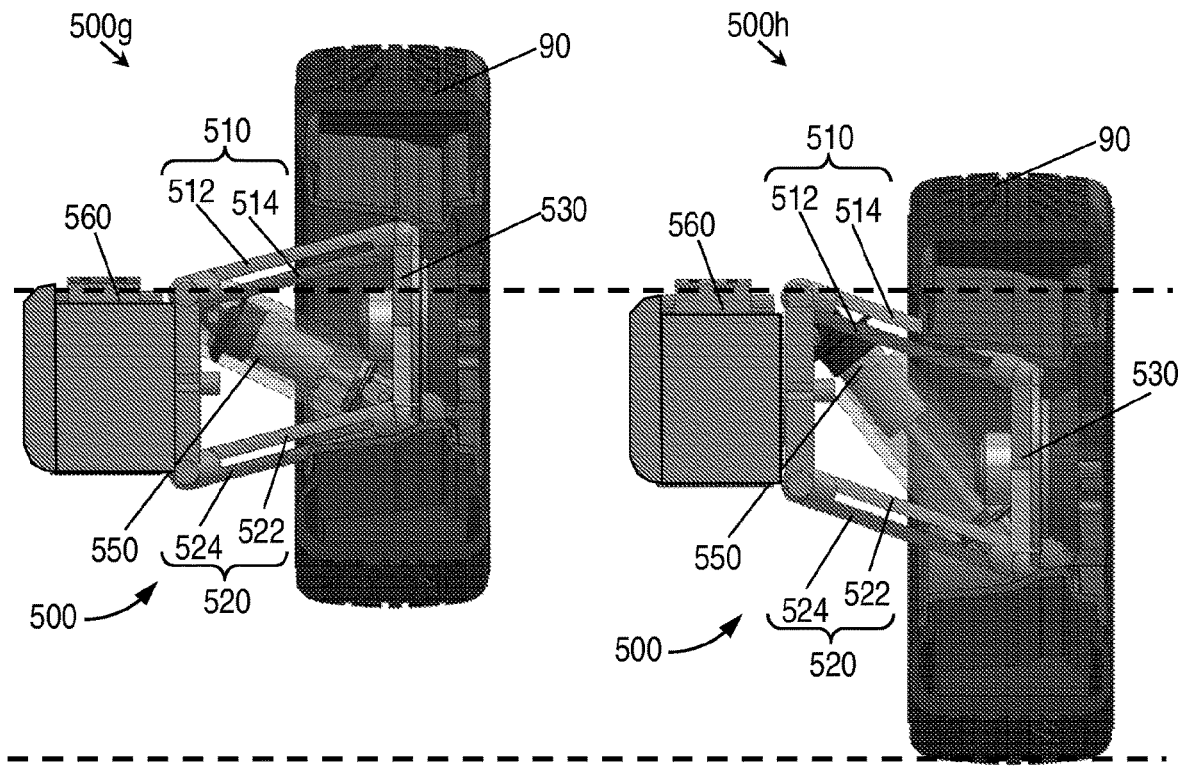
FIGS. 9D and 9E are schematic illustrations of a suspension system and a wheel, showing suspension capabilities of the suspension system, according to some embodiments of the invention.
Figure 9E:
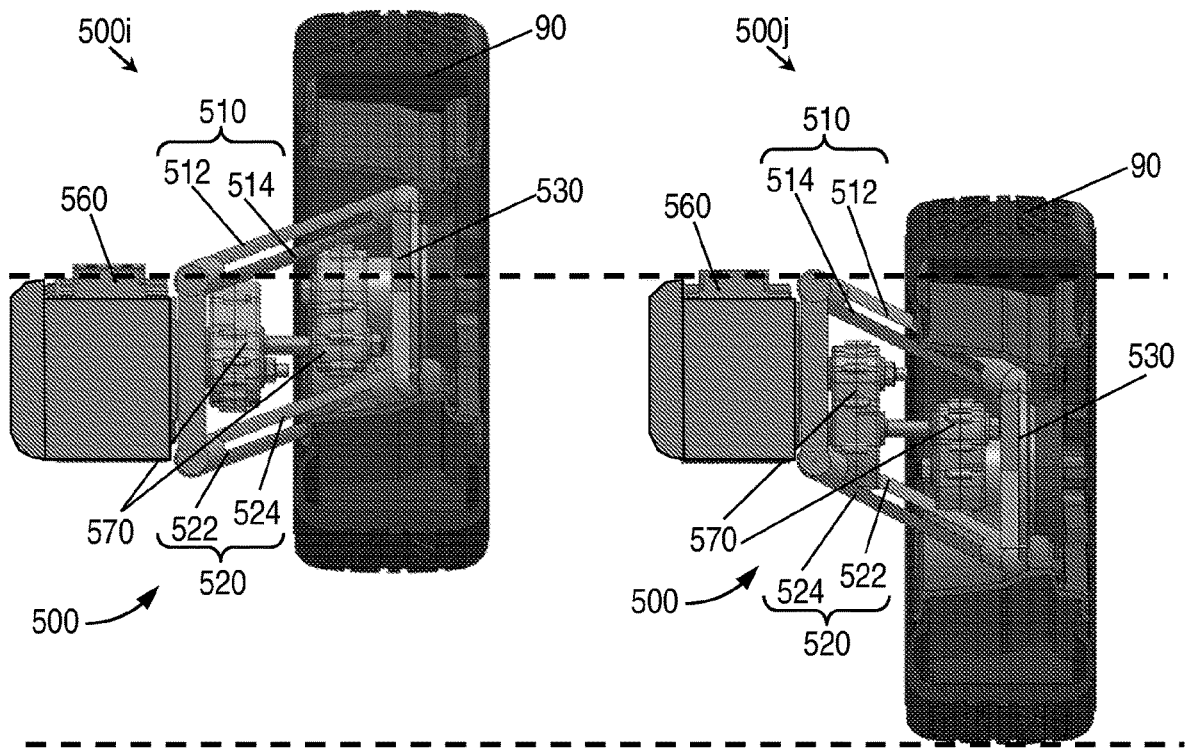

Reference is now made to FIGS. 9D and 9E, which are schematic illustrations of a more detailed aspect of a suspension system 500 assembled within a wheel and showing suspension capabilities of suspension system 500, according to some embodiments of the invention.

Illustrations 500g, 500h and 500i, 500j in FIGS. 9D and 9E, respectively show a front view of suspension system 500 and wheel 90 for different vertical positions of suspension system 500. FIG. 9D does not show transmission assembly 570 and FIG. 5E does not show shock absorption and springing means 550 for sake of clarity.

According to some embodiments, the disclosed suspension systems (such as system 100, 200, 300, 500 and 500) may include at least one pair of arms each including a first arm and a second arm. The first arm and the second arm of the at least one pair of arms may be set across each other to define a mobile steering axis extending through a virtual intersection therebetween, while each of the first arm and the second arm may be rotatably connected at its first end to a wheel interface and at its second end to a reference frame of the vehicle.

In some embodiments, each one of suspension systems described elsewhere herein may further include a steering actuator (not illustrated). In a nonlimiting example, the steering actuator may include a steering rod connected to the wheel interface (e.g. between the frame and the wheel interface). Steering rod may be telescopic as to push/pull the wheel interface. In some embodiments, the steering actuator may be assembled between the suspension arm and the wheel interface to rotate the wheel interface about a pivot. In some embodiments, suspension systems described elsewhere herein may further include a steering controller adapted to control the steering actuator to terminate steering when the steering angle is entering into the range of between 45 and 90 degrees (e.g. when steering angle is >45 deg, >60 deg.), e.g. to avoid incursion into the vehicle frame.

Accordingly, the mobile steering axis may move (e.g., substantially along a longitudinal axis of the suspension system/vehicle) when steering angle of the wheel interface/wheel changes. In this manner, the incursion of the wheel into a cabin of the vehicle (upon steering of the wheel interface/wheel) may be significantly reduced as compared to current suspension systems having stationary steering axis.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A suspension system for a steerable wheel of a vehicle, the suspension system comprises:
a wheel interface, adapted to support a wheel having a spinning axis;
one or more suspension arms connected to the wheel interface;
wherein, the wheel interface is steerable with respect to the one or more suspension arms about a steering axis, the steering axis extending through an interface between the one or more suspension arms and the wheel interface; and
a position of the steering axis is adaptable in a longitudinal direction with respect to the vehicle;
wherein the wheel interface allows spinning the wheel about the spinning axis, such that a distance between the steering axis and the spinning axis increases when increasing a steering angle in at least one direction.

2. The suspension system of claim 1, adapted to operate with a motor and a transmission assembly, wherein the motor is coupled to the wheel through the transmission assembly for transmitting rotations generated by the motor to the wheel while enabling steering of the wheel interface.

3. The suspension system of claim 1, wherein a movement of the steering axis is non-continuous, when changing a steering angle.

4. The suspension system of claim 1, comprising:
a steering actuator;
a steering controller;
wherein the steering controller is adapted to control the steering actuator to terminate steering when a steering angle is in the range of between 45 and 90 degrees.

5. The suspension system of claim 1, wherein a maximal steering angle towards at least one steering direction is between 45 and 90 degrees.

6. The vehicle of claim 1, wherein a vertical size of the suspension system is smaller than a diameter dimension of the wheel.

7. A suspension system for a steerable wheel of a vehicle, the suspension system comprises:
a wheel interface, adapted to support a wheel having a spinning axis;
one or more suspension arms connected to the wheel interface;
wherein, the wheel interface is steerable with respect to the one or more suspension arms about a steering axis, the steering axis extending through an interface between the one or more suspension arms and the wheel interface; and
a position of the steering axis is adaptable in a longitudinal direction with respect to the vehicle;
wherein steering the wheel interface changes a distance between the steering axis and the spinning axis.

8. The suspension system of claim 7, wherein a movement ratio defined between a transformation of the steering axis in parallel to the longitudinal direction of the vehicle and a transformation of the steering axis in a lateral direction is higher than 10.

9. The suspension system of claim 7, wherein the steering axis is defined by the one or more suspension arms, and the wheel interface.

10. The suspension system of claim 7, comprising:
a reference frame, adapted to couple the suspension system to the vehicle; and
the one or more suspension arms are coupled to the reference frame.

11. The suspension system of claim 7, comprising: a first suspension arm coupled to the wheel interface at an upper portion of the wheel interface using an upper interface and a second suspension arm coupled to the wheel interface at a bottom portion of the wheel interface using a bottom interface, wherein the steering axis extends through the upper interface and the bottom interface.

12. A suspension system for a steerable wheel of a vehicle, the suspension system comprises:
a wheel interface, adapted to support a wheel having a spinning axis;
one or more suspension arms connected to the wheel interface;
wherein, the wheel interface is steerable with respect to the one or more suspension arms about a steering axis, the steering axis extending through an interface between the one or more suspension arms and the wheel interface; and
a position of the steering axis is adaptable in a longitudinal direction with respect to the vehicle;
wherein rotating of the one or more suspension arms with respect to the wheel interface changes a distance between position of the steering axis and the spinning axis.

13. The suspension system of claim 12, further comprising a shock absorption and springing means adapted to be rotatably connected at its first end to a reference frame and at its second end to the wheel interface.

14. The suspension system of claim 12, wherein the entire steering axis moves at least partially in a direction which is substantially parallel to the longitudinal direction of the vehicle.

15. The suspension system of claim 12, wherein steering the wheel interface changes the position of the steering axis in a longitudinal direction with respect to the wheel interface.

16. The suspension system of claim 12, comprising an arm support coupled to a reference frame, wherein the one or more suspension arms is pivotally connected to the arm support to allow the one or more suspension arms to rotate with respect to the reference frame.

17. A suspension system for a steerable wheel of a vehicle, the suspension system comprises:
a wheel interface, adapted to support a wheel having a spinning axis;
one or more suspension arms connected to the wheel interface;
wherein, the wheel interface is steerable with respect to the one or more suspension arms about a steering axis, the steering axis extending through an interface between the one or more suspension arms and the wheel interface;
a position of the steering axis is adaptable in a longitudinal direction with respect to the vehicle; and one or more guides coupled to the wheel interface and to the one or more suspension arms, the one or more guides comprising a predefined path that defines a movement of the steering axis with respect to the spinning axis or a movement of the steering axis with respect to the wheel interface.

18. The suspension system of claim 17, adapted to operate with a motor and a transmission assembly, wherein the motor is coupled to the wheel through the transmission assembly for transmitting rotations generated by the motor to the wheel while enabling steering of the wheel interface.

19. The suspension system of claim 17, wherein each of the one or more guides comprises a slot that defines a movement of the one or more suspension arms along the path with respect to the wheel interface.

20. The suspension system of claim 19, wherein the slot is curved.

\* \* \* \* \*